US012174559B2

(12) United States Patent
Kamimura et al.

(10) Patent No.: US 12,174,559 B2
(45) Date of Patent: Dec. 24, 2024

(54) TONER CARTRIDGE HAVING ELECTRICAL CONTACT SURFACE THAT CAN CONTACT ELECTRICAL CONTACT SURFACE OF DRUM CARTRIDGE IN ACCORDANCE WITH PIVOTAL MOVEMENT OF CASING

(71) Applicant: BROTHER KOGYO KABUSHIKI KAISHA, Nagoya (JP)

(72) Inventors: Naoya Kamimura, Ichinomiya (JP); Hideshi Nishiyama, Owariasahi (JP); Masaaki Furukawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/296,569

(22) Filed: Apr. 6, 2023

(65) Prior Publication Data

US 2023/0251591 A1 Aug. 10, 2023

Related U.S. Application Data

(63) Continuation of application No. 17/690,804, filed on Mar. 9, 2022, now Pat. No. 11,650,520, which is a (Continued)

(30) Foreign Application Priority Data

Sep. 30, 2019 (JP) ................................ 2019-180986

(51) Int. Cl.
*G03G 15/08* (2006.01)
*G03G 21/16* (2006.01)

(52) U.S. Cl.
CPC ..... *G03G 15/0886* (2013.01); *G03G 15/0863* (2013.01); *G03G 15/0889* (2013.01); *G03G 15/0891* (2013.01); *G03G 21/1652* (2013.01)

(58) Field of Classification Search
CPC ........... G03G 15/0863; G03G 15/0886; G03G 15/0889; G03G 15/0891
(Continued)

(56) References Cited

U.S. PATENT DOCUMENTS 9,465,317 B2 10/2016 Kikuchi et al.
2015/0261181 A1 9/2015 Moon et al.
(Continued)

FOREIGN PATENT DOCUMENTS

JP 2004109367 * 4/2004
JP 2014-25990 A 2/2014
(Continued)

OTHER PUBLICATIONS

International Search Report issued in related application PCT/JP2020/036240, mailed Nov. 24, 2020.
(Continued)

*Primary Examiner* — Hoan H Tran
(74) *Attorney, Agent, or Firm* — Merchant & Gould P.C.

(57) ABSTRACT

A toner cartridge includes: a casing having a first toner accommodating portion and a second toner accommodating portion; an agitator; an auger; a first protrusion positioned at one side in a first direction of the second toner accommodating portion; a second protrusion positioned at another side in the first direction of the second accommodating portion; a memory; and a toner-side electrical contact surface electrically connected to the memory. The toner cartridge is attachable to a drum cartridge by the casing pivotally moving from a first position to a second position relative to the drum cartridge about the first protrusion and the second protrusion. When the casing is at the first position, the toner-side electrical contact surface does not contact a first electrical contact surface of the drum cartridge. When the casing is at the second position, the toner-side electrical contact surface contacts the first electrical contact surface.

1 Claim, 19 Drawing Sheets

Related U.S. Application Data continuation of application No. PCT/JP2020/036240, filed on Sep. 25, 2020.

(58) Field of Classification Search
USPC .......................................................... 399/263
See application file for complete search history.

(56) References Cited

U.S. PATENT DOCUMENTS

| | | | |
|---|---|---|---|
| 2017/0075297 | A1 | 3/2017 | Eto |
| 2017/0285530 | A1 | 10/2017 | Nishiyama et al. |
| 2018/0095420 | A1 | 4/2018 | Abe et al. |
| 2018/0107155 | A1 | 4/2018 | Shimizu et al. |

FOREIGN PATENT DOCUMENTS

| | | | |
|---|---|---|---|
| JP | 2016-118623 | A | 6/2016 |
| JP | 2017-54022 | A | 3/2017 |
| JP | 2017-182008 | A | 10/2017 |
| JP | 2018-54998 | A | 4/2018 |
| JP | 2018-66973 | A | 4/2018 |

OTHER PUBLICATIONS

International Preliminary Report on Patentability and Written Opinion of the International Searching Authority issued in corresponding International Patent Application No. PCT/JP2020/036240, dated Apr. 5, 2022.

* cited by examiner

1

TONER CARTRIDGE HAVING ELECTRICAL CONTACT SURFACE THAT CAN CONTACT ELECTRICAL CONTACT SURFACE OF DRUM CARTRIDGE IN ACCORDANCE WITH PIVOTAL MOVEMENT OF CASING

REFERENCE TO RELATED APPLICATIONS

This application is a continuation of U.S. patent application Ser. No. 17/690,804 filed Mar. 9, 2022, now U.S. Pat. No. 11,650,520,which is a by-pass continuation application of International Application No. PCT/JP2020/036240 filed Sep. 25, 2020, claiming priority from Japanese Patent Application No. 2019-180986 filed Sep. 30, 2019. The entire contents of the aforementioned applications are incorporated herein by reference.

BACKGROUND ART

Background

There has been conventionally known a toner cartridge including a casing, a toner conveying unit, a first cover, and a shutter. The casing is configured to accommodate therein toner, and has an accommodating portion opening. The toner conveying unit is configured to convey toner in the casing to the accommodating portion opening. The first cover is configured to cover the accommodating portion opening. The first cover has a discharge opening allowing the toner to be discharged therethrough. The shutter has a shutter opening, and includes a first protrusion.

When the toner cartridge is mounted to a developing unit, the first protrusion is positioned relative to the developing unit. The casing is pivotally movable together with the first cover relative to the developing unit between a first position and a second position. When the casing is at the first position, the shutter closes the discharge opening. When the casing is at the second position, at least a portion of the shutter opening overlaps at least a portion of the discharge opening, and the shutter opening allows the toner to be discharged through the discharge opening.

Description

SUMMARY

There is a demand to provide a memory at the conventional toner cartridge described above.

In view of the foregoing, it is an object of the present disclosure to provide a toner cartridge that enables a toner-side electrical contact surface electrically connected to a memory of the toner cartridge to make contact with an electrical contact surface of a drum cartridge in accordance with an attachment operation of the toner cartridge to the drum cartridge.

In order to attain the above and other objects, according to one aspect, the present disclosure provides a toner cartridge attachable to a drum cartridge. The drum cartridge includes a photosensitive drum and has a first electrical contact surface. The toner cartridge includes: a casing; an agitator; an auger; a first protrusion; a second protrusion; a memory; and a toner-side electrical contact surface. The casing extends in a first direction. The casing includes: a first toner accommodating portion; and a second toner accommodating portion. The first toner accommodating portion has a first interior space extending in the first direction. The second toner accommodating portion is positioned at one side in a second direction of the first toner accommodating portion and has a second interior space. The second interior space extends in the first direction and is in communication with the first interior space. The casing has a first opening positioned at one side in the first direction of the second toner accommodating portion. The first opening allows toner in the second interior space to be discharged therethrough. The agitator is rotatable about a first axis extending in the first direction. The agitator is configured to agitate the toner in the first interior space and to convey the toner from the first interior space to the second interior space. The auger is rotatable about a second axis extending in the first direction. The auger is configured to convey the toner from the second interior space to the first opening. The first protrusion is positioned at the one side in the first direction of the second toner accommodating portion and is positioned at one side in the first direction of the first opening. The first protrusion extends in the first direction. The second protrusion is positioned at another side in the first direction of the second toner accommodating portion. The second protrusion extends in the first direction. The memory stores therein information relating to the toner cartridge. The toner-side electrical contact surface is electrically connected to the memory. The first protrusion and the second protrusion are positioned relative to the drum cartridge when the toner cartridge is mounted to the drum cartridge. The toner cartridge is attachable to the drum cartridge by the casing pivotally moving about the first protrusion and the second protrusion from a first position to a second position relative to the drum cartridge after the toner cartridge is mounted to the drum cartridge. When the casing is at the first position, the toner-side electrical contact surface does not make contact with the first electrical contact surface. When the casing is at the second position, the toner-side electrical contact surface makes contact with the first electrical contact surface.

With this configuration, the toner cartridge is positioned relative to the drum cartridge using the first protrusion and the second protrusion in a state where the toner cartridge is mounted to the drum cartridge.

The toner cartridge is attachable to the drum cartridge as the casing pivotally moves from the first position to the second position in a state where the toner cartridge is positioned relative to the drum cartridge.

The toner-side electrical contact surface makes contact with the first electrical contact surface of the drum cartridge in a state where the casing is at the second position and the toner cartridge is attached to the drum cartridge.

That is, the toner cartridge enables the toner-side electrical contact surface to make contact with the first electrical contact surface in a state where the toner cartridge is positioned relative to the drum cartridge at the first protrusion and the second protrusion.

Accordingly, the toner-side electrical contact surface can reliably make contact with the first electrical contact surface.

According to another aspect, the present disclosure also provides an image forming apparatus to which the above-described toner cartridge is attachable. The image forming apparatus includes: a main casing; an electrical connector; and the drum cartridge. The drum cartridge is attachable to the main casing in a state where the toner cartridge is attached to the drum cartridge. The drum cartridge further has a second electrical contact surface electrically connected to the first electrical contact surface. The second electrical contact surface is electrically connected to the electrical connector in a state where the drum cartridge is attached to the main casing.

With this configuration, the image forming apparatus can access the memory of the toner cartridge using the electrical connector through the first electrical contact surface and the second electrical contact surface of the drum cartridge in a state where the toner cartridge and the drum cartridge are attached to the main casing.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

Figure 1:
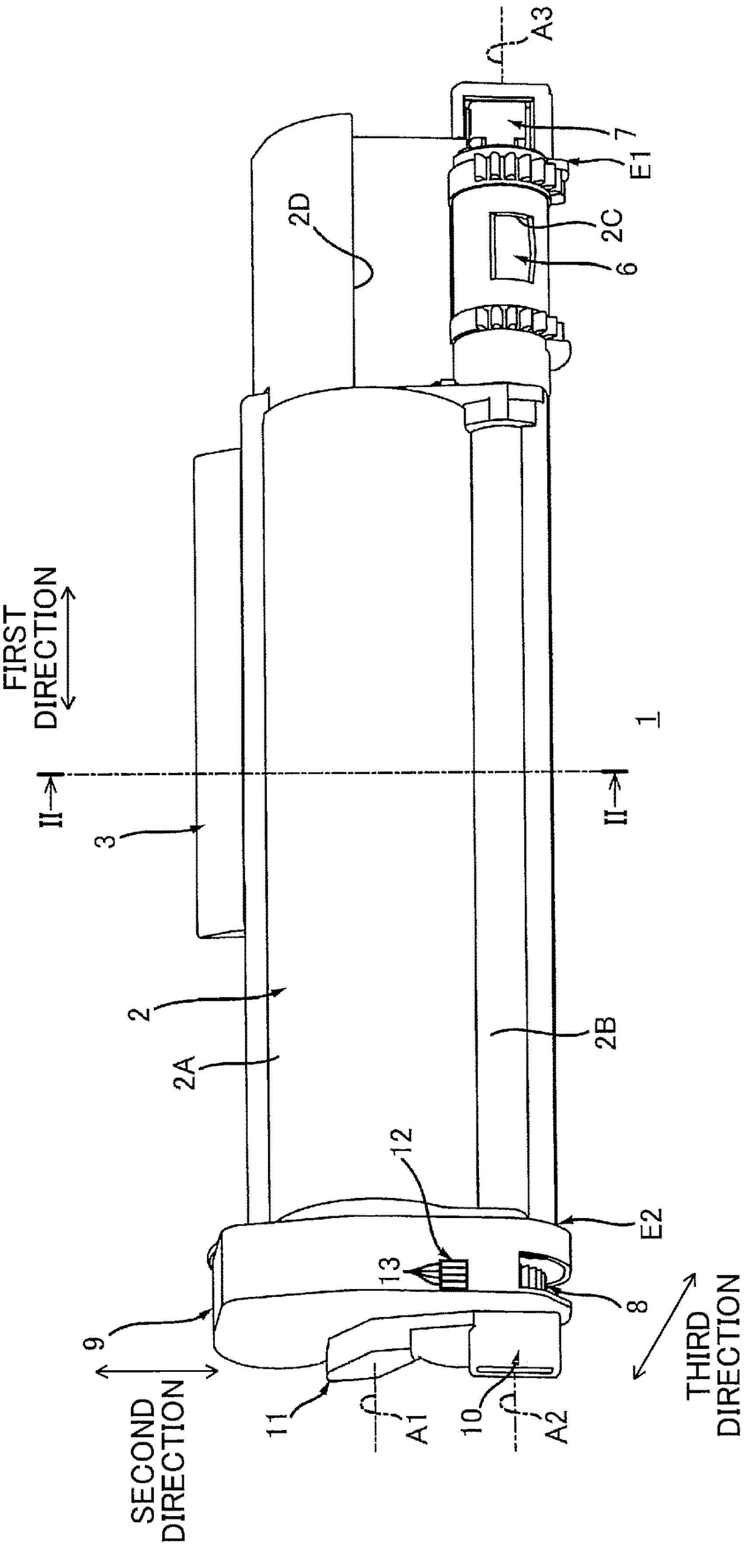
FIG. 1 is a perspective view of a toner cartridge.

Hereinafter, one embodiment of the present disclosure will be described while referring to the accompanying drawings.

<1. Toner Cartridge 1>

A toner cartridge 1 according to the embodiment will be described with reference to FIGS. 1 to 4B. The toner cartridge 1 includes a casing 2, a handle 3, an agitator 4 (see FIG. 2), an auger 5 (see FIG. 2), a shutter 6, a first protrusion 7, an auger gear 8, a gear cover 9, a second protrusion 10, a locking protrusion 11, a memory 12, and a plurality of toner-side electrical contact surfaces 13.

<1.1 Casing 2>

As illustrated in FIG. 1, the casing 2 extends in a first direction, and has one end portion E1 and another end portion E2 in the first direction. The other end portion E2 is positioned away from the one end portion E1 in the first direction. The casing 2 is configured to accommodate therein toner. The casing 2 includes a first toner accommodating portion 2A, and a second toner accommodating portion 2B. The casing 2 has a first opening 2C, and a recessed portion 2D.

<1.1.1 First Toner Accommodating Portion 2A>

As illustrated in FIG. 1, the first toner accommodating portion 2A extends in the first direction. The first toner accommodating portion 2A has a hollow cylindrical shape.

Figure 2:
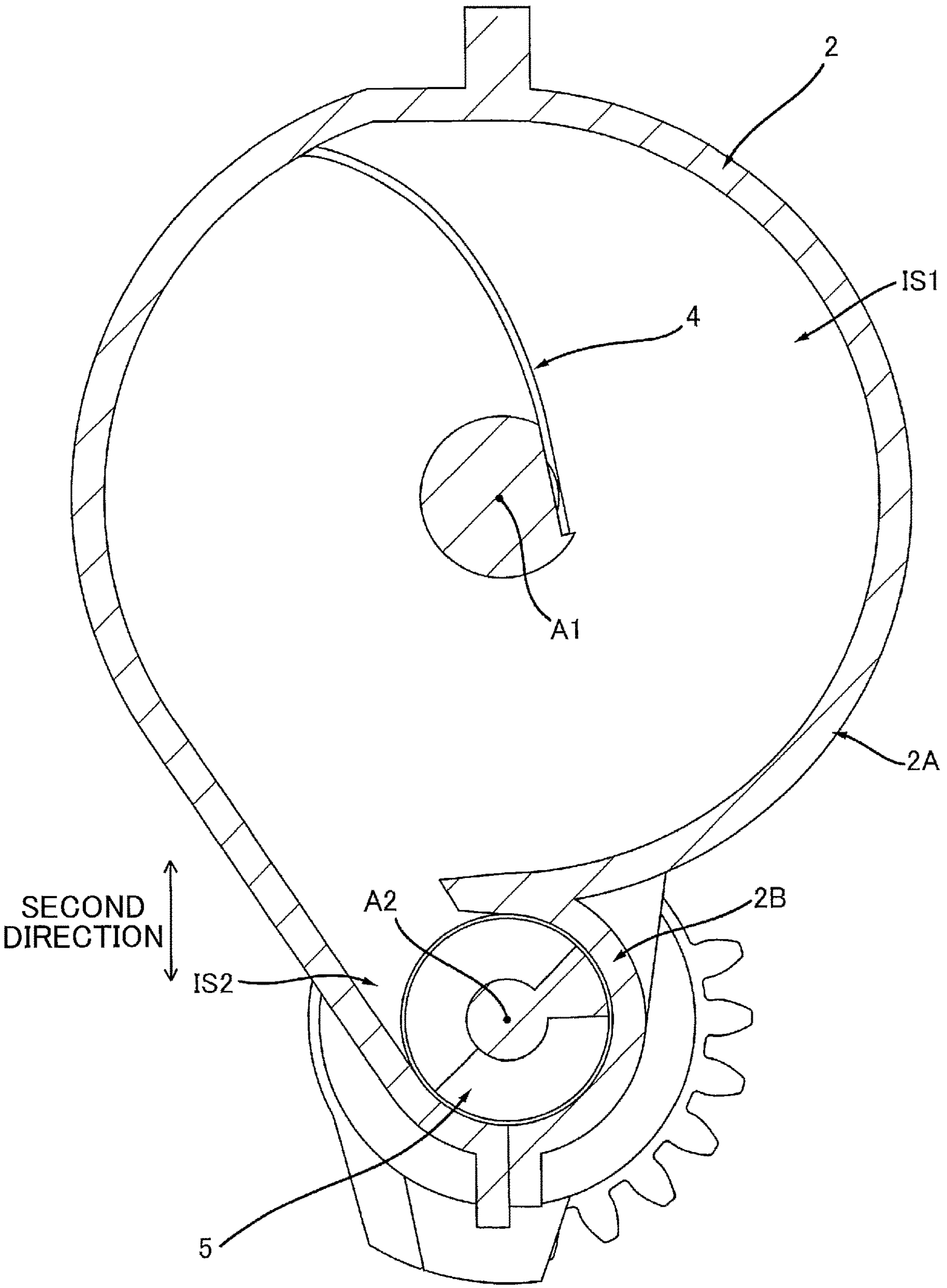
FIG. 2 is a cross-sectional view taken along a line II-II in FIG. 1.

As illustrated in FIG. 2, the first toner accommodating portion 2A has a first internal space IS1 extending in the first direction. The first toner accommodating portion 2A is configured to accommodate toner in the first internal space IS1.

<1.1.2 Second Toner Accommodating Portion 2B>

As illustrated in FIG. 1, the second toner accommodating portion 2B is positioned at one side in a second direction of the first toner accommodating portion 2A. The second direction crosses the first direction. Preferably, the second direction is perpendicular to the first direction. Specifically, the second direction is a defined by connecting a first axis A1 and a second axis A2 to each other. The first axis A1 and the second axis A2 will be described later. The second toner accommodating portion 2B extends in the first direction. The second toner accommodating portion 2B has a hollow cylindrical shape.

As illustrated in FIG. 2, the second toner accommodating portion 2B has a second internal space IS2. The second internal space IS2 is in communication with the first internal space IS1. The second internal space IS2 extends in the first direction. The second toner accommodating portion 2B is configured to accommodate toner in the second internal space IS2. The second toner accommodating portion 2B has an outer diameter smaller than an outer diameter of the first toner accommodating portion 2A.

<1.1.3 First Opening 2C>

As illustrated in FIG. 1, the first opening 2C is positioned at the one end portion E1 in the first direction of the casing 2. Specifically, the first opening 2C is positioned at one side in the first direction of the second toner accommodating portion 2B. The first opening 2C is positioned away from the second toner accommodating portion 2B in the first direction, and aligned with the second toner accommodating portion 2B in the first direction. The first opening 2C allows the toner in the second internal space IS2 to be discharged therethrough.

<1.1.4 Recessed Portion 2D>

The recessed portion 2D is positioned at one side in the first direction of the first toner accommodating portion 2A. The recessed portion 2D is positioned at another side in the second direction of the first opening 2C, and is positioned away from the first opening 2C in the second direction.

<1.2 Handle 3>

As illustrated in FIG. 1, the handle 3 is positioned at an outer surface of the casing 2. The handle 3 is positioned at the opposite side of the first toner accommodating portion 2A from the second toner accommodating portion 2B in the second direction. The handle 3 protrudes in the second direction from the outer surface of the casing 2. The handle 3 extends in the first direction.

<1.3 Agitator 4>

As illustrated in FIG. 2, the agitator 4 is positioned inside the first internal space IS1. The agitator 4 is rotatable about the first axis A1 extending in the first direction. When rotating, the agitator 4 agitates the toner in the first internal space IS1. Further, rotation of the agitator 4 causes the toner to be conveyed from the first internal space IS1 to the second internal space IS2.

<1.4 Auger 5>

As illustrated in FIG. 2, the auger 5 is positioned inside the second internal space IS2. The auger 5 extends in the first direction. The auger 5 is rotatable about the second axis A2 extending in the first direction. Rotation of the auger 5 causes the toner to conveyed from the second internal space IS2 to the first opening 2C (see FIG. 1).

<1.5 Shutter 6>

As illustrated in FIG. 1, the shutter 6 is positioned at the one end portion E1 in the first direction of the casing 2. Specifically, the shutter 6 is positioned at one end portion in the first direction of the second toner accommodating portion 2B. The shutter 6 is movable relative to the casing 2 between a closed position (see FIG. 3A) and an open position (see FIG. 3B). The shutter 6 is rotatable about a third axis A3 extending in the first direction between the closed position and the open position.

Specifically, the shutter 6 extends in the first direction. The shutter 6 has a hollow cylindrical shape. The shutter 6 is positioned inside the casing 2. The shutter 6 has an internal space in communication with the second internal space IS2. The shutter 6 has a second opening 6A (see FIG. 3B).

Figure 3A:
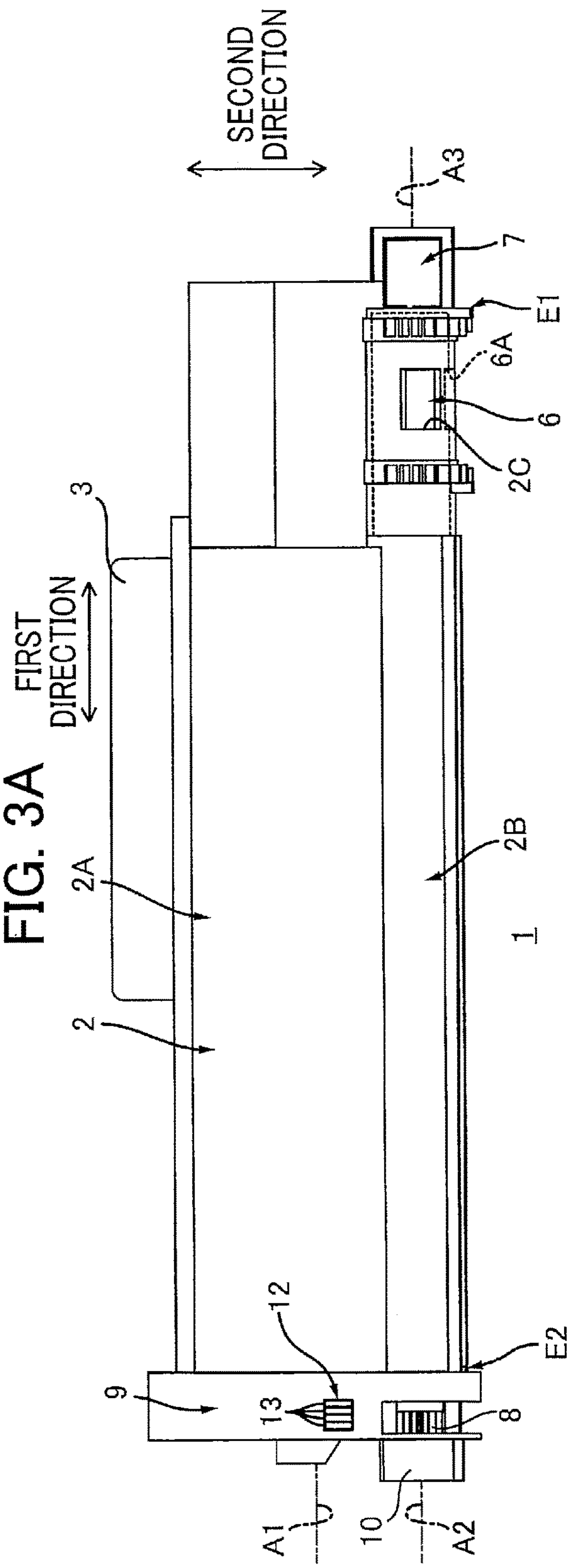
FIG. 3A is a view of the toner cartridge, and illustrating a state where a shutter of the toner cartridge is at its closed position.

As illustrated in FIG. 3A, an entire portion of the second opening 6A does not overlap the first opening 2C in a state where the shutter 6 is at the closed position. Hence, the toner in the second internal space IS2 is not discharged through the first opening 2C in a state where the shutter 6 is at the closed position. That is, the shutter 6 closes the first opening 2C in a state where the shutter 6 is at the closed position.

Figure 3B:
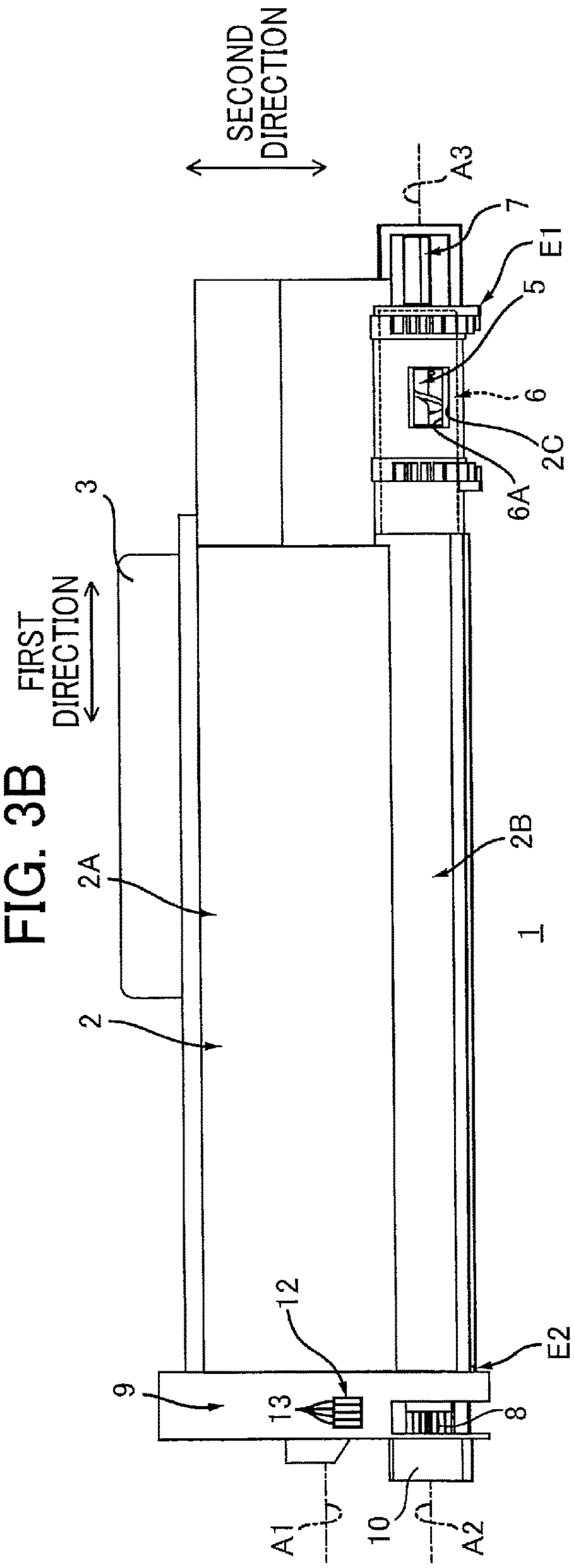
FIG. 3B is a view of the toner cartridge, and illustrating a state where the shutter is at its open position.

On the other hand, as illustrated in FIG. 3B, at least a portion of the second opening 6A overlaps at least a portion of the first opening 2C when the shutter 6 is at the open position. Accordingly, the toner in the second internal space IS2 is discharged through the first opening 2C and the second opening 6A in a state where the shutter 6 is at the open position. That is, the first opening 2C is opened in a state where the shutter 6 is at the open position.

<1.6 First Protrusion 7>

As illustrated in FIG. 1, the first protrusion 7 is positioned at the one side in the first direction of the second toner accommodating portion 2B. The first protrusion 7 is positioned at one side in the first direction of the first opening 2C. The first protrusion 7 is positioned at the opposite side of the first opening 2C from the second toner accommodating portion 2B in the first direction. The first protrusion 7 extends in the first direction.

The first protrusion 7 is rotatable together with the shutter 6 relative to the casing 2. Specifically, the first protrusion 7 extends from the shutter 6. In other words, the shutter 6 includes the first protrusion 7. Alternatively, the first protrusion 7 may be attached to the shutter 6. The first protrusion 7 extends in the second direction in a state where the shutter 6 is at the closed position. The first protrusion 7 extends in a third direction in a state where the shutter 6 is at the open position. The third direction crosses the first direction and the second direction. Preferably, the third direction is perpendicular to the first direction and crosses the second direction.

<1.7 Auger Gear 8>

As illustrated in FIG. 1, the auger gear 8 is positioned at the other end portion E2 in the first direction of the casing 2. The auger gear 8 is coupled to an end portion in the first direction of the auger 5. The auger gear 8 is rotatable together with the auger 5.

<1.8 Gear Cover 9>

As illustrated in FIG. 1, the gear cover 9 is attached to the other end portion E2 in the first direction of the casing 2. The gear cover 9 covers the auger gear 8.

<1.9 Second Protrusion 10>

The second protrusion 10 is positioned at another side in the first direction of the second toner accommodating portion 2B. In other words, the second protrusion 10 is positioned at the opposite side of the second toner accommodating portion 2B from the first opening 2C and the first protrusion 7 in the first direction. The second protrusion 10 is positioned at another side in the first direction of the auger gear 8. In other words, the second protrusion 10 is positioned at the opposite side of the auger gear 8 from the first opening 2C and the first protrusion 7 in the first direction. The second protrusion 10 is positioned at another side in the first direction of the gear cover 9. In other words, the second protrusion 10 is positioned at the opposite side of the gear cover 9 from the first opening 2C and the first protrusion 7 in the first direction.

The second protrusion 10 extends from the gear cover 9. Alternatively, the second protrusion 10 may be attached to the gear cover 9. The second protrusion 10 extends in the first direction and the second direction.

<1.10 Locking Protrusion 11>

As illustrated in FIG. 1, the locking protrusion 11 is positioned at another side in the first direction of the first toner accommodating portion 2A. The locking protrusion 11 is positioned at the other side in the first direction of the gear cover 9. The locking protrusion 11 extends from the gear cover 9. The locking protrusion 11 may be attached to the gear cover 9. The locking protrusion 11 extends in the first direction. The locking protrusion 11 is positioned away from the second protrusion 10 in the second direction.

<1.11 Memory 12>

As illustrated in FIG. 1, the memory 12 is positioned at an outer surface in the third direction of the gear cover 9. Specifically, the memory 12 is attached to the outer surface in the third direction of the gear cover 9. The memory 12 is positioned between the second protrusion 10 and the locking protrusion 11 in the second direction. The memory 12 has a flat plate shape. The memory 12 is an IC chip and stores therein information relating to the toner cartridge 1. The information relating to the toner cartridge 1 includes, for example, information as to whether the toner cartridge 1 is a new cartridge or a used cartridge, and information as to the numbers of sheets (or dot counts) printable using the toner cartridge 1.

<1.12 Toner-Side Electrical Contact Surfaces 13>

The plurality of toner-side electrical contact surfaces 13 are positioned at the outer surface in the third direction of the gear cover 9. Specifically, the plurality of toner-side electrical contact surfaces 13 are positioned at a surface of the memory 12. In other words, the memory 12 has the plurality of toner-side electrical contact surfaces 13 in the present embodiment. The plurality of toner-side electrical contact surfaces 13 are positioned between the second protrusion 10 and the locking protrusion 11 in the second direction. The plurality of toner-side electrical contact surfaces 13 are electrically connected to the memory 12.

Note that the plurality of toner-side electrical contact surfaces 13 may be positioned away from the memory 12. In the latter case, each of the plurality of toner-side electrical contact surfaces 13 is electrically connected to the memory 12 through a wiring. Only one toner-side electrical contact surface 13 may be employed.

<1.13 Attachment of Toner Cartridge 1 to Image Forming Apparatus 100>

Figure 4A:
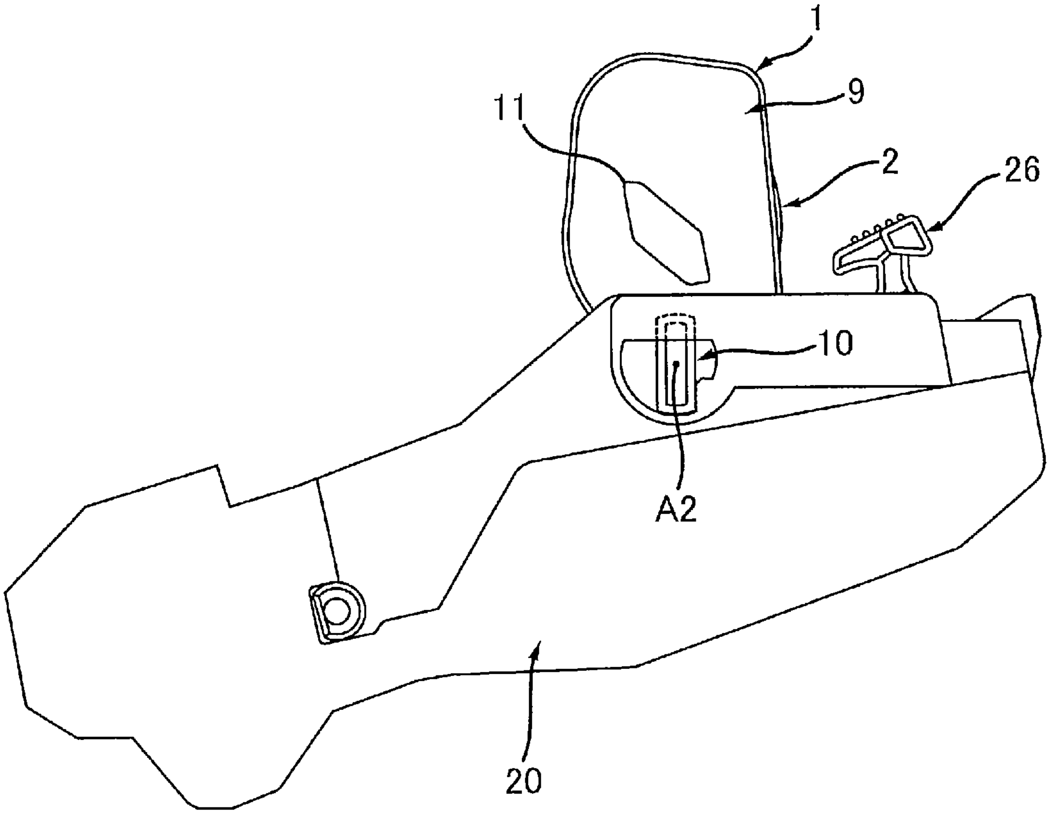
FIG. 4A illustrates a state where the toner cartridge is mounted to a drum cartridge and a casing is at its first position.
Figure 4B:
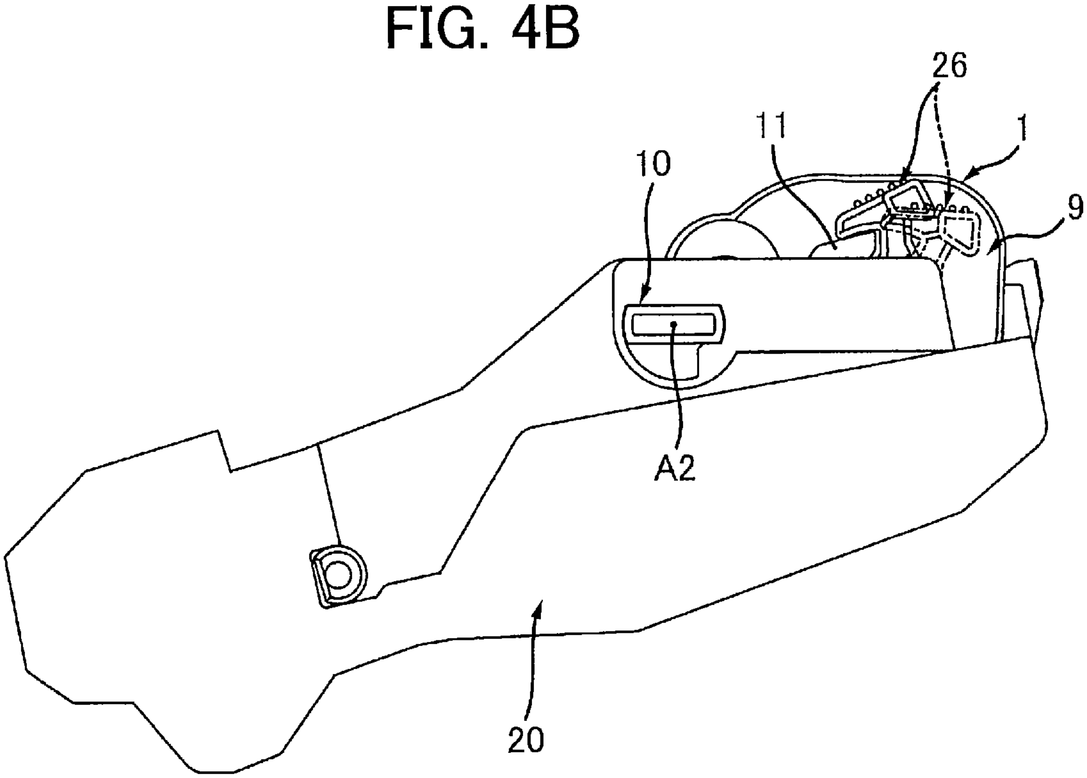
FIG. 4B illustrates a state where the casing illustrated in FIG. 4A is positioned at its second position and the toner cartridge is attached to the drum cartridge.

As illustrated in FIG. 4A, the toner cartridge 1 can be mounted to a drum cartridge 20 (described later). As illustrated in FIG. 4B, the toner cartridge 1 is attachable to the drum cartridge 20 by the casing 2 pivotally moving about the first protrusion 7 (see FIGS. 8A and 8B) and the second protrusion 10 from a first position (see FIG. 4A) to a second position (see FIG. 4B) relative to the drum cartridge 20 after the toner cartridge 1 is mounted to the drum cartridge 20.

"The casing 2 pivotally moves" denotes that the casing 2 and the gear cover 9 pivotally moves about the second axis A2. "A state where the toner cartridge 1 is mounted to the drum cartridge 20" denotes a state before the casing 2 pivotally moves, i.e., a state where the casing 2 is at the first position. "A state where the toner cartridge 1 is attached to the drum cartridge 20" denotes a state after the casing 2 pivotally moves, i.e., a state where the casing 2 is at the second position.

Figure 5:
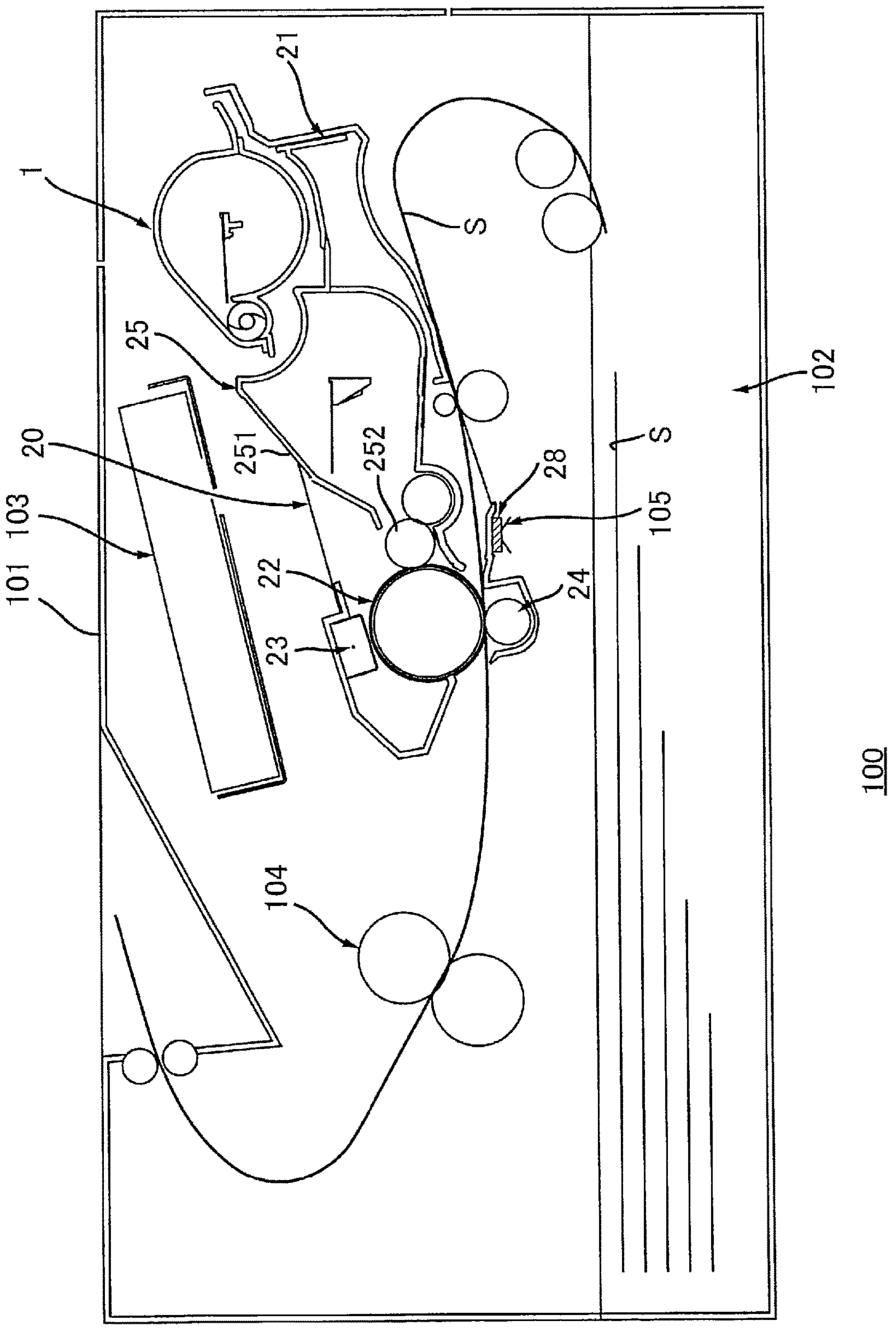
FIG. 5 is a schematic diagram illustrating a configuration of an image forming apparatus.

As illustrated in FIG. 5, the drum cartridge 20 is attachable to an image forming apparatus 100 (described later) while the toner cartridge 1 is attached to the drum cartridge 20. In this way, the toner cartridge 1 is attachable to the image forming apparatus 100.

<2. Drum Cartridge 20>

Figure 6:
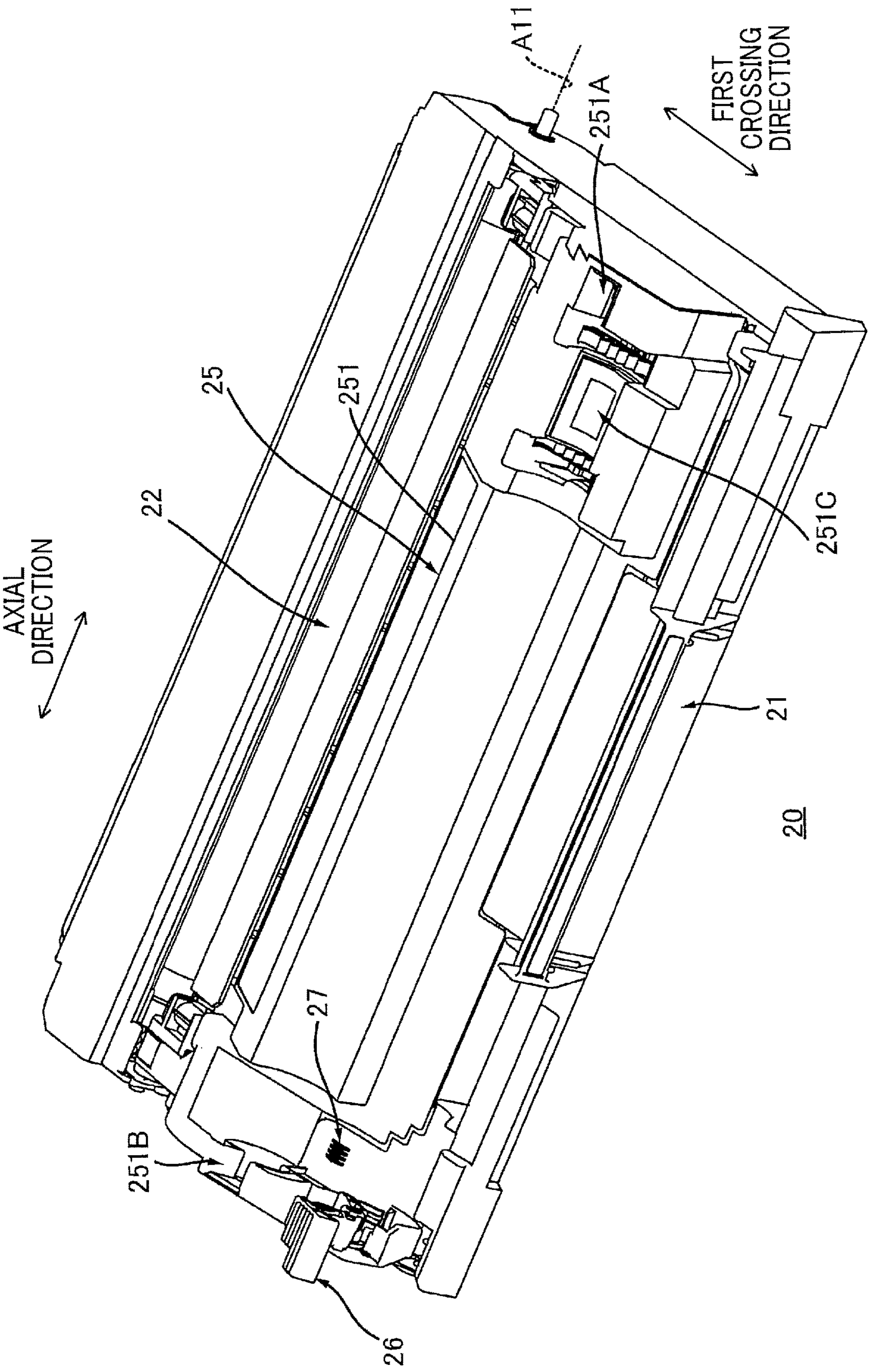
FIG. 6 is a perspective view of the drum cartridge.
Figure 7:
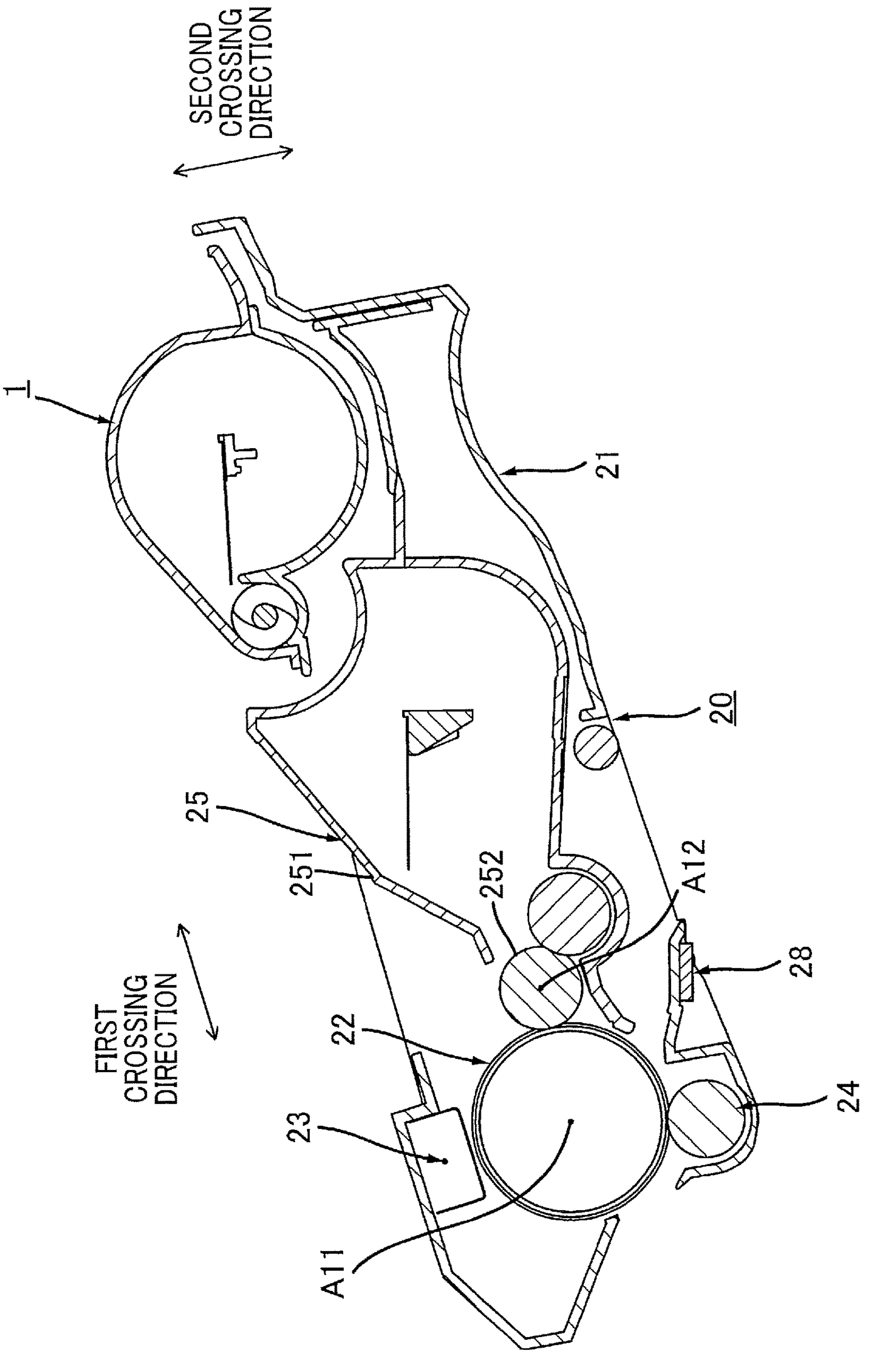
FIG. 7 is a cross-sectional view of the drum cartridge to which the toner cartridge is attached.

Next, the drum cartridge 20 will be described with reference to FIGS. 6 through 11B. As illustrated in FIGS. 6 and 7, the drum cartridge 20 includes a drum frame 21, a photosensitive drum 22, a charger 23 (see FIG. 7), a transfer roller 24 (see FIG. 7), a developing unit 25, a lock lever 26, a first electrical contact surface 27, and a second electrical contact surface 28 (see FIG. 7).

<2.1 Drum Frame 21>

The drum frame 21 supports the photosensitive drum 22, the charger 23, the transfer roller 24, and the developing unit 25. The drum frame 21 extends in an axial direction and a first crossing direction. The axial direction is a direction in which a drum axis A11 of the photosensitive drum 22 extends. The axial direction is coincident with the first direction in a state where the toner cartridge 1 is mounted to the drum cartridge 20.

The first crossing direction crosses the axial direction. Specifically, the first crossing direction is perpendicular to the axial direction. More specifically, the first crossing direction is defined by connecting the drum axis A11 and a developing axis A12 to each other.

<2.2 Photosensitive Drum 22>

The photosensitive drum 22 is positioned at one end portion in the first crossing direction of the drum frame 21. The photosensitive drum 22 extends in the axial direction. The photosensitive drum 22 is rotatable about the drum axis A11.

<2.3 Charger 23>

The charger 23 is configured to charge a surface of the photosensitive drum 22 in a state where the toner cartridge 1 and the drum cartridge 20 are attached to the image forming apparatus 100, as illustrated in FIG. 5. The charger 23 is a scorotron charger. The charger 23 may be a charging roller instead.

<2.4 Transfer Roller 24>

The transfer roller 24 is positioned at the opposite side of the photosensitive drum 22 from the charger 23 in a second crossing direction. The second crossing direction crosses both the axial direction and the first crossing direction. The transfer roller 24 is configured to transfer the toner on the photosensitive drum 22 to a sheet S in a state where the toner cartridge 1 and the drum cartridge 20 are attached to the image forming apparatus 100.

<2.5 Developing Unit 25>

As illustrated in FIG. 6, the developing unit 25 is positioned at another end portion in the first crossing direction of the drum frame 21. As illustrated in FIG. 5, the developing unit 25 is configured to receive the toner discharged from the toner cartridge 1 in a state where the toner cartridge 1 and the drum cartridge 20 are attached to the image forming apparatus 100. In other words, the toner cartridge 1 is configured to supply the toner to the developing unit 25. The developing unit 25 is configured to supply the toner to the photosensitive drum 22. The developing unit 25 includes a developing casing 251, and a developing roller 252. In other words, the drum cartridge 20 includes the developing roller 252.

<2.5.1 Developing Casing 251>

The developing casing 251 is configured to accommodate therein the toner supplied from the toner cartridge 1. As illustrated in FIG. 6, the developing casing 251 has a groove 251A, a groove 251B, and a developing opening 251C.

<2.5.1.1 Groove 251A>

The groove 251A is positioned at one end portion in the first direction of the developing casing 251. As illustrated in FIG. 8A, the first protrusion 7 is fitted into the groove 251A when the toner cartridge 1 is mounted to the drum cartridge 20. Accordingly, the first protrusion 7 is positioned relative to the drum cartridge 20 when the toner cartridge 1 is mounted to the drum cartridge 20.

Figure 8B:
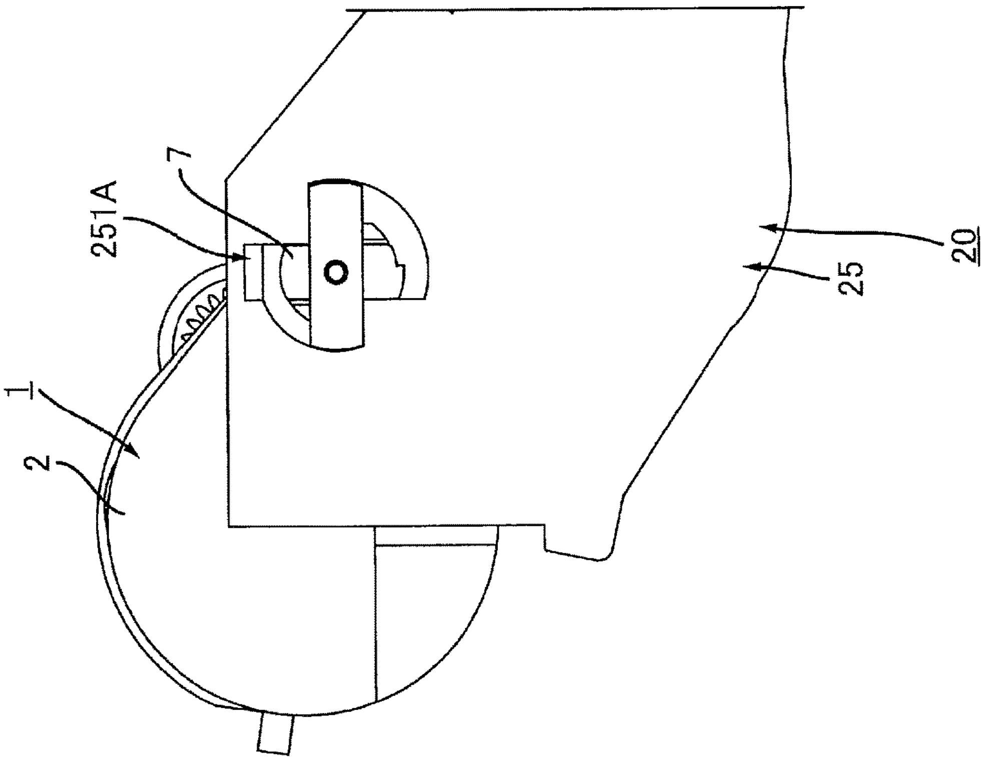
FIG. 8B is a view of the toner cartridge and the developing unit as viewed from the one side in the first direction, and particularly illustrating a state where the casing illustrated in FIG. 8A is at the second position and the toner cartridge is attached to the drum cartridge.
Figure 8A:
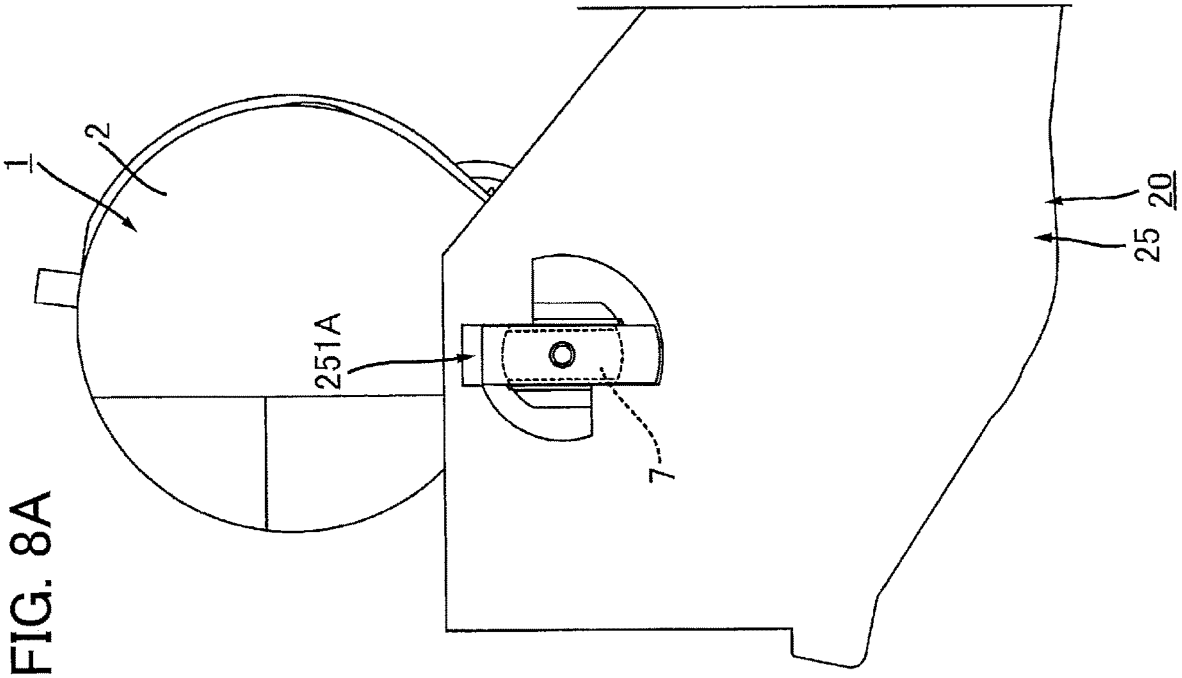
FIG. 8A is a side view of the toner cartridge and a developing unit as viewed from one side in a first direction, and particularly illustrating a state where the toner cartridge is mounted to the drum cartridge and the casing is at the first position.

As illustrated in FIGS. 8A and 8B, the first protrusion 7 is not rotatable relative to the drum cartridge 20 in a state where the first protrusion 7 is fitted into the groove 251A. The casing 2 pivotally moves relative about the first protrusion 7 when the toner cartridge 1 is mounted to the drum cartridge 20 and the casing 2 pivotally moves from the first position (see FIG. 8A) to the second position (see FIG. 8B).

Figure 9B:
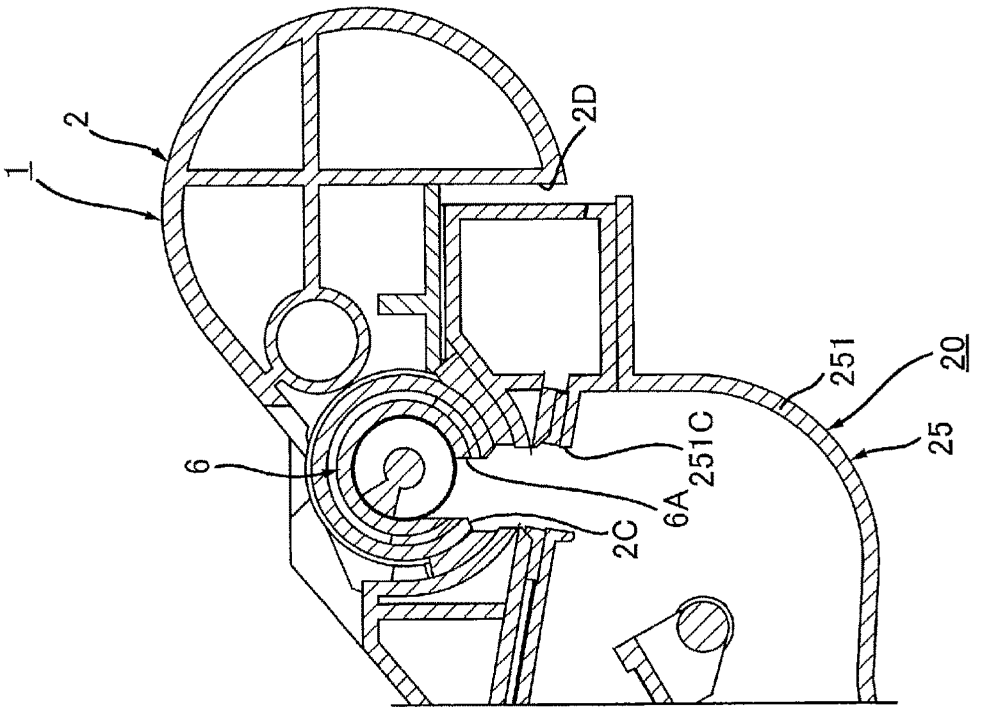
FIG. 9B is a cross-sectional view of the toner cartridge and the developing unit taken along the plane passing through the developing opening, and particularly illustrating a state where the casing illustrated in FIG. 9A is at the second position and the toner cartridge is attached to the drum cartridge.
Figure 9A:
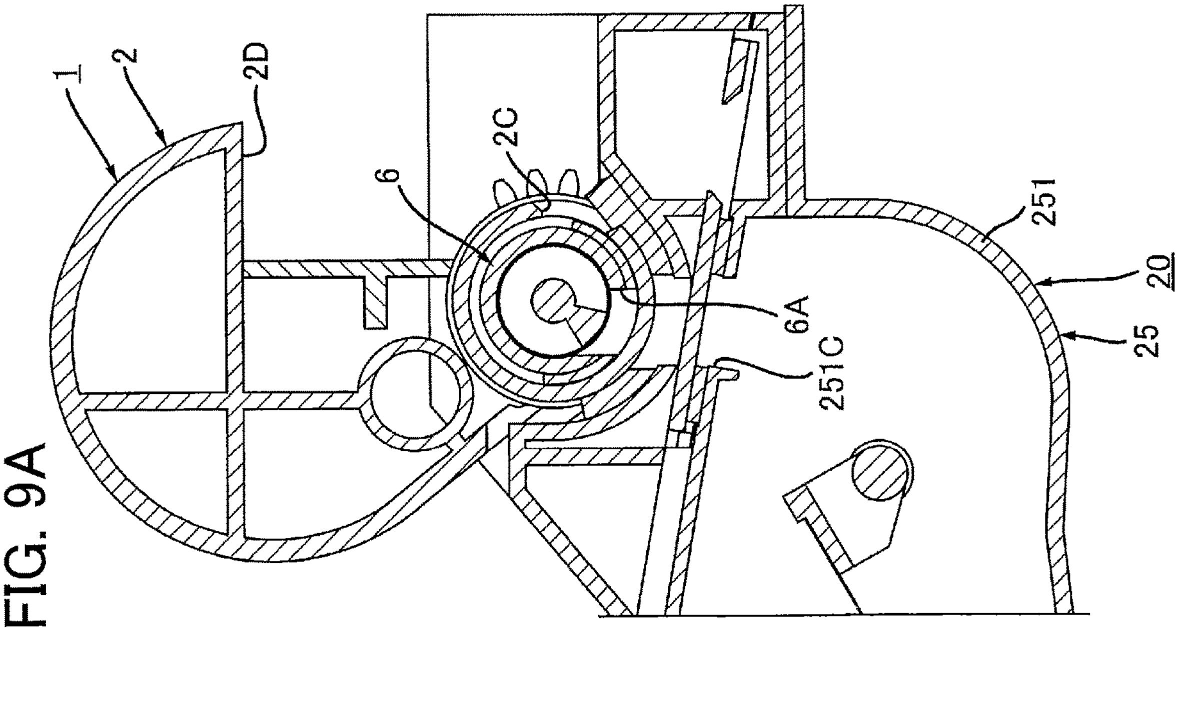
FIG. 9A is a cross-sectional view of the toner cartridge and the developing unit taken along a plane passing through a developing opening, and particularly illustrating a state where the toner cartridge is mounted to the drum cartridge and the casing is at the first position.

That is, as illustrated in FIGS. 9A and 9B, the casing 2 pivotally moves relative to the shutter 6 when the casing 2 pivotally moves from the first position (see FIG. 9A) to the second position (FIG. 9B).

The first opening 2C of the casing 2 is in communication with the second opening 6A of the shutter 6 in a state where the casing 2 is at the second position, as illustrated in FIG. 9B. That is, the shutter 6 is positioned at the open position relative to the casing 2 in a state where the casing 2 is at the second position.

On the other hand, the first opening 2C of the casing 2 is positioned away from the second opening 6A of the shutter 6 and thus is not in communication with the second opening 6A in a state where the casing 2 is at the first position, as illustrated in FIG. 9A. That is, the shutter 6 is positioned at the closed position relative to the casing 2 in a state where the casing 2 is at the first position.

<2.5.1.2 Groove 251B>

As illustrated in FIG. 6, the groove 251B is positioned at another end portion in the first direction of the developing casing 251. As illustrated in FIG. 10A, the second protrusion 10 is fitted into the groove 251B when the toner cartridge 1 is mounted to the drum cartridge 20. Accordingly, the second protrusion 10 is positioned relative to the casing 2 when the casing 2 is mounted to the drum cartridge 20.

Figure 10B:
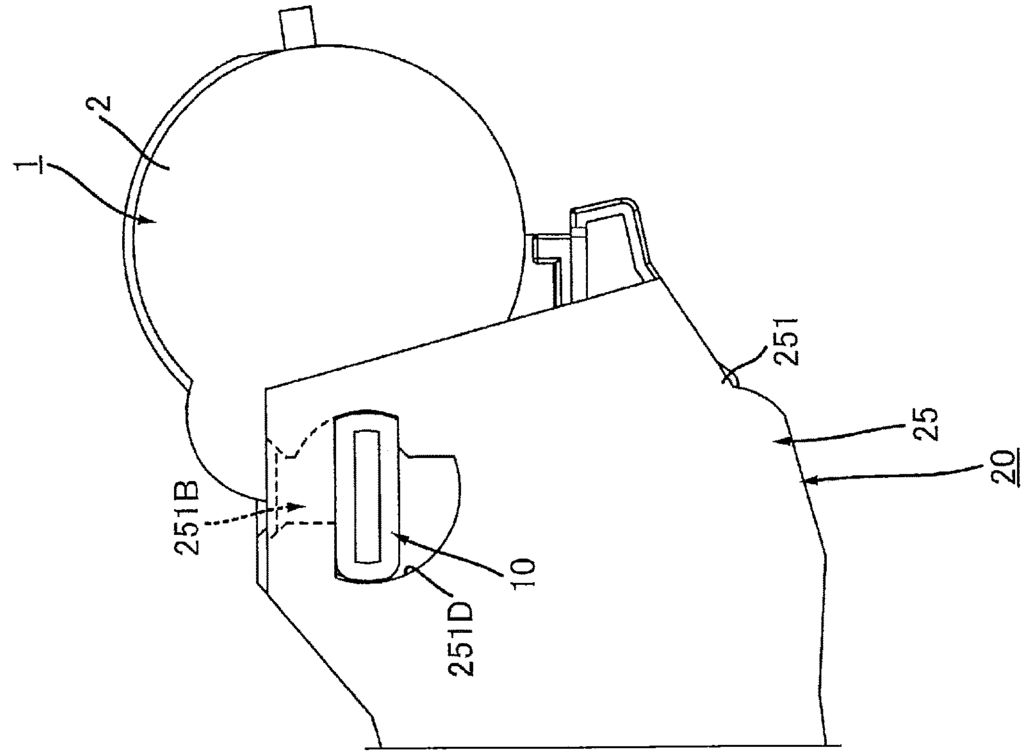
FIG. 10B is a side view of the toner cartridge and the developing unit as viewed from the other side in the first direction, and particularly illustrating a state where the casing illustrated in FIG. 10A is at the second position and the toner cartridge is attached to the drum cartridge.
Figure 10A:
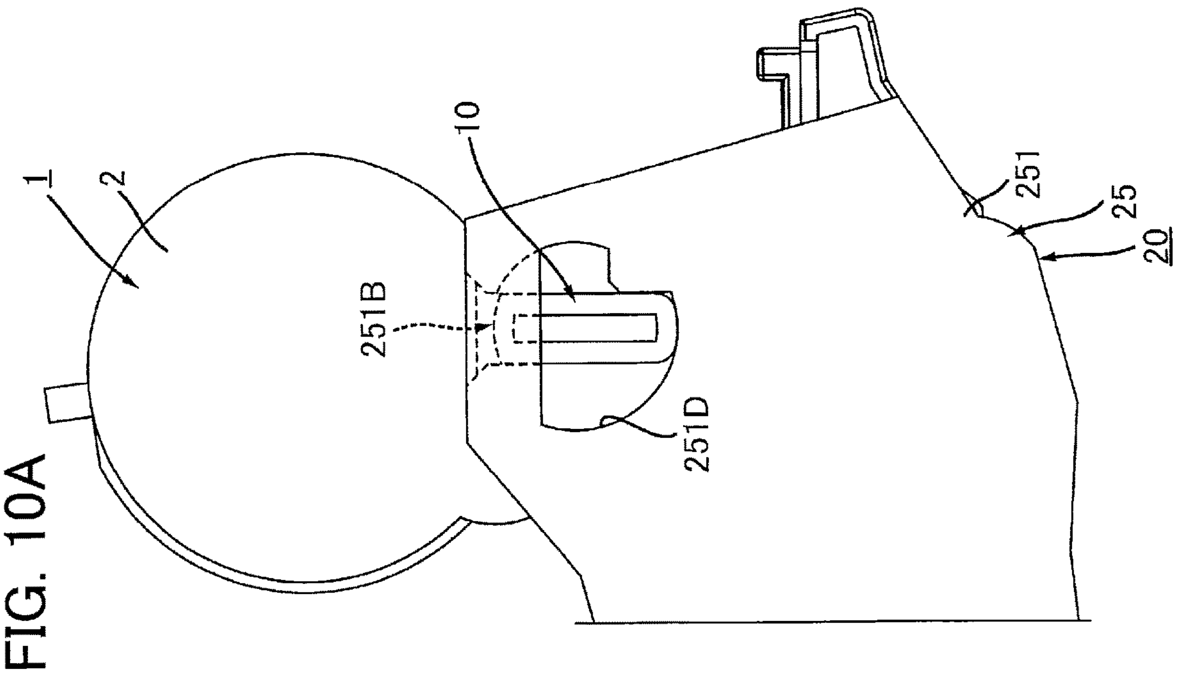
FIG. 10A is a side view of the toner cartridge and the developing unit as viewed from another side in the first direction, and particularly illustrating a state where the toner cartridge is mounted to the drum cartridge and the casing is at the first position.

As illustrated in FIGS. 10A and 10B, the second protrusion 10 is rotatable relative to the drum cartridge 20 in a state where the second protrusion 10 is fitted into the groove 251B. Specifically, the second protrusion 10 is rotatable together with the casing 2 when the casing 2 pivotally moves from the first position (see FIG. 10A) to the second position (see FIG. 10B) while the toner cartridge 1 is mounted to the drum cartridge 20.

More specifically, the groove 251B has a recessed portion 251D. The recessed portion 251D allows the second protrusion 10 to rotate in a state where the second protrusion 10 is fitted into the groove 251B. The recessed portion 251D has an arcuate shape.

<2.5.1.3 Developing Opening 251C>

As illustrated in FIG. 6, the developing opening 251C is positioned between the groove 251A and the groove 251B in the first direction. The developing opening 251C is in communication with an internal space of the developing casing 251.

As illustrated in FIG. 9A, the first opening 2C is positioned away from the developing opening 251C in a state where the toner cartridge 1 is mounted to the drum cartridge 20. Hence, the developing opening 251C is not in communication with the first opening 2C and the second opening 6A in a state where the toner cartridge 1 is mounted to the drum cartridge 20. That is, the toner cartridge 1 cannot supply toner to the developing unit 25 in a state where the toner cartridge 1 is mounted to the drum cartridge 20.

On the other hand, as illustrated in FIG. 9B, the developing opening 251C is in communication with the first opening 2C and the second opening 6A of the toner cartridge 1 in a state where the toner cartridge 1 is attached to the drum cartridge 20. As a result, the toner cartridge 1 can supply toner to the developing unit 25 in a state where the toner cartridge 1 is attached to the drum cartridge 20.

<2.5.2 Developing Roller 252>

As illustrated in FIG. 7, the developing roller 252 is positioned at one end portion in the first crossing direction of the developing casing 251. The developing roller 252 is supported by the developing casing 251. The developing roller 252 is configured to make contact with the photosensitive drum 22 and to supply the toner in the developing casing 251 to the photosensitive drum 22. The developing roller 252 extends in the first direction. The developing roller 252 is rotatable about the developing axis A12 extending in the first direction.

<2.6 Lock Lever 26>

As illustrated in FIG. 6, the lock lever 26 is positioned at one end portion in the axial direction of the drum frame 21. The lock lever 26 is positioned away from the groove 251B in the first crossing direction. The lock lever 26 is positioned at the opposite side of the groove 251B from the photosensitive drum 22 in the first crossing direction. The lock lever 26 is movable between a locking position (a position indicated by a solid line in FIG. 4B) and an unlocking position (a position indicated by a two-dotted chain line in FIG. 4B).

As indicated by the solid line in FIG. 4B, the lock lever 26 engages with the locking protrusion 11 of the toner cartridge 1 in a state where the toner cartridge 1 is attached to the drum cartridge 20 and the lock lever 26 is at the locking position. In this way, the casing 2 is locked at the second position.

On the other hand, as indicated by the two-dotted chain line in FIG. 4B, the lock lever 26 is positioned away from the locking protrusion 11 of the toner cartridge 1 in a state where the toner cartridge 1 is attached to the drum cartridge 20 and the lock lever 26 is at the unlocking position, thereby allowing the casing 2 to move from the second position to the first position.

<2.7 First Electrical Contact Surface 27>

As illustrated in FIG. 6, the first electrical contact surface 27 is positioned at the one end portion in the axial direction of the drum frame 21. The first electrical contact surface 27 is positioned between the groove 251B and the lock lever 26 in the first crossing direction.

Figure 11A:
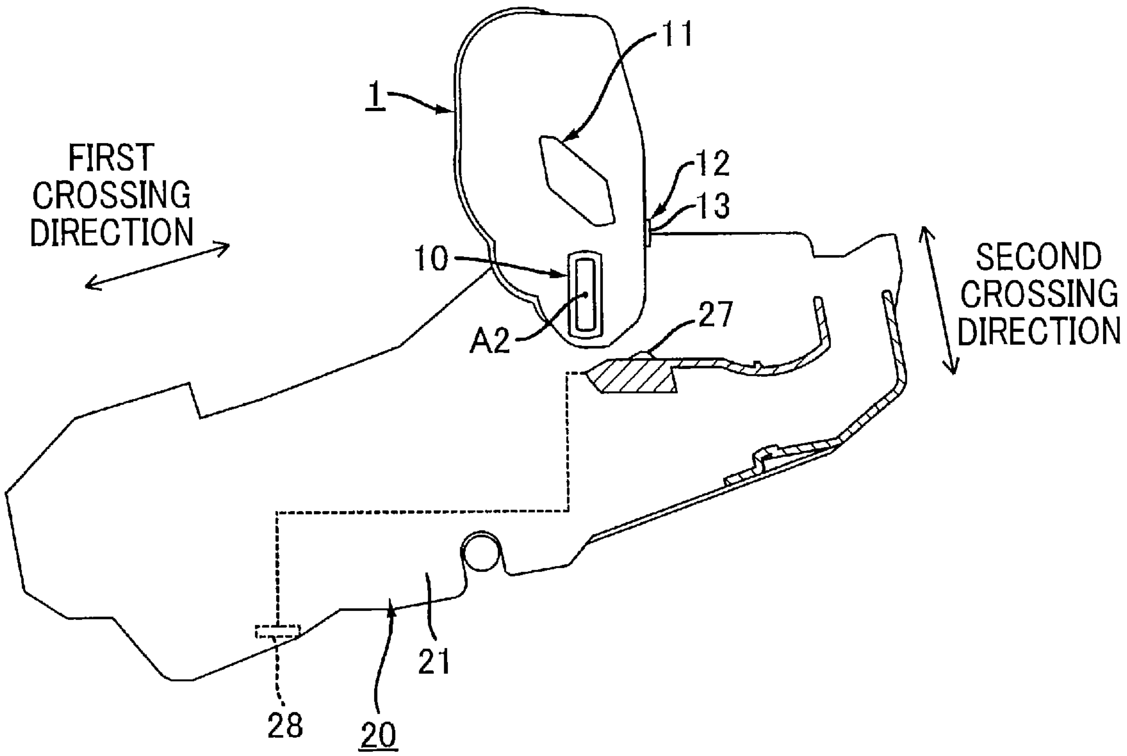
FIG. 11A illustrates a state where the toner cartridge is mounted to the drum cartridge, the casing is at the first position, and a first electrical contact surface and a second electrical contact surface are positioned away from each other.

The toner-side electrical contact surfaces 13 are positioned away from the first electrical contact surface 27 when the casing 2 is at the first position, as illustrated in FIG. 11A. Accordingly, the toner-side electrical contact surfaces 13 do not make contact with the first electrical contact surface 27 when the casing 2 is at the first position.

Figure 11B:
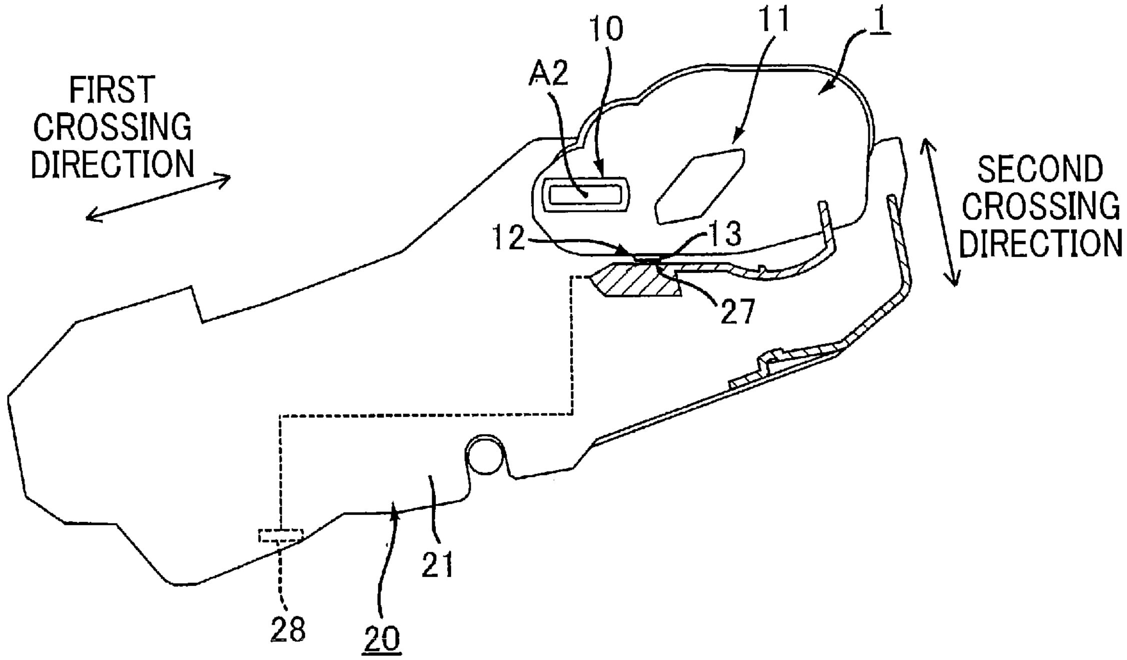
FIG. 11B illustrates a state where the casing illustrated in FIG. 11A is at the second position, the toner cartridge is attached to the drum cartridge, and the first electrical contact surface and the second electrical contact surface are in contact with each other.

On the other hand, the toner-side electrical contact surfaces 13 make contact with the first electrical contact surface 27 when the casing 2 is at the second position, as illustrated in FIG. 11B.

<2.8 Second Electrical Contact Surface 28>

As illustrated in FIG. 11A, the second electrical contact surface 28 is provided at the drum frame 21. In the present embodiment, the second electrical contact surface 28 is positioned at one outer surface in the second crossing direction of the drum frame 21. In a state where the drum cartridge 20 is attached to a main casing 101 of the image forming apparatus 100, the second electrical contact surface 28 is positioned at a lower surface of the drum frame 21. The second electrical contact surface 28 is electrically connected to the first electrical contact surface 27. The first electrical contact surface 27 and the second electrical contact surface 28 are connected to each other via, for example, a flat cable.

<3. Image Forming Apparatus 100>

Next, the image forming apparatus 100 will be described with reference to FIG. 5. The image forming apparatus 100 includes the main casing 101, a sheet cassette 102, an exposure unit 103, a fixing unit 104, and an electrical connector 105 in addition to the toner cartridge 1 and the drum cartridge 20 those are described above.

<3.1 Main Casing 101>

The main casing 101 accommodates therein the sheet cassette 102, the exposure unit 103, the fixing unit 104, and the electrical connector 105. The main casing 101 accommodates therein the toner cartridge 1 and the drum cartridge 20 in a state where the toner cartridge 1 and the drum cartridge 20 are attached to the image forming apparatus 100.

<3.2 Sheet Cassette 102>

The sheet cassette 102 is configured to accommodate therein the sheet(s) S. The sheet S in the sheet cassette 102 is conveyed toward the photosensitive drum 22 in a state where the toner cartridge 1 and the drum cartridge 20 are attached to the image forming apparatus 100. The sheet S is, for example, a printing paper.

<3.3 Exposure Unit 103>

The exposure unit 103 is configured to expose the photosensitive drum 22 to light in a state where the toner cartridge 1 and the drum cartridge 20 are attached to the image forming apparatus 100. After the charger 23 charges the surface of the photosensitive drum 22, the exposure unit 103 exposes the surface of the photosensitive drum 22 to light by irradiating the same with laser beam, whereby an electrostatic latent image is formed on the surface of the photosensitive drum 22. The exposure unit 103 is a laser scan unit. However, an LED array may be employed as the exposure unit 103.

The electrostatic latent image is developed as the toner in the developing unit 25 is supplied to the surface of the photosensitive drum 22. Hence, a toner image is formed on the surface of the photosensitive drum 22. The toner image is transferred from the surface of the photosensitive drum 22 to the sheet S using the transfer roller 24.

<3.4 Fixing Unit 104>

The fixing unit 104 is configured to heat and press the sheet S on which the toner image is transferred to fix the toner image to the sheet S. The sheet S moved past the fixing unit 104 is discharged out of the main casing 101.

<3.5 Electrical Connector 105>

The electrical connector 105 is electrically connected to a control circuit board (not illustrated) of the image forming apparatus 100. The control circuit board is configured to control operations in the image forming apparatus 100. The electrical connector 105 is positioned below the drum cartridge 20 in a state where the drum cartridge 20 is attached to the main casing 101.

The second electrical contact surface 28 is electrically connected to the electrical connector 105 in a state where the drum cartridge 20 is attached to the main casing 101. Therefore, the control circuit board is electrically connected to the toner-side electrical contact surfaces 13 and the memory 12 through the first electrical contact surface 27 (see FIG. 11B), the second electrical contact surface 28, and the electrical connector 105 in a state where the drum cartridge 20 is attached to the main casing 101. As a result, the control circuit board can read information relating to the toner cartridge 1 stored in the memory 12.

<4. Advantageous Effects>

(1) According to the toner cartridge 1, as illustrated in FIGS. 8A and 10A, the toner cartridge 1 is positioned relative to the drum cartridge 20 at the first protrusion 7 and the second protrusion 10 in a state where the toner cartridge 1 is mounted to the drum cartridge 20.

The toner cartridge 1 is attachable to the drum cartridge 20 by the casing 2 pivotally moving from the first position to the second position in a state where the toner cartridge 1 is positioned relative to the drum cartridge 20, as illustrated in FIGS. 8A and 10A.

As illustrated in FIG. 11B, the toner-side electrical contact surfaces 13 makes contact with the first electrical contact surface 27 of the drum cartridge 20 in a state where the casing 2 is at the second position and the toner cartridge 1 is attached to the drum cartridge 20.

That is, the toner-side electrical contact surfaces 13 can make contact with the first electrical contact surface 27 in a state where the toner cartridge 1 is positioned relative to the drum cartridge 20 by the first protrusion 7 and the second protrusion 10.

The above configuration enables the toner-side electrical contact surfaces 13 and the first electrical contact surface 27 to reliably make contact with each other.

(2) According to the toner cartridge 1, as illustrated in FIG. 5, the image forming apparatus 100 can access the memory 12 of the toner cartridge 1 using the electrical connector 105 through the first electrical contact surface 27 (see FIG. 11B) and the second electrical contact surface 28 of the drum cartridge 20 in a state where the toner cartridge 1 and the drum cartridge 20 are attached to the main casing 101.

<5. Modifications>

While the description has been made in detail with reference to the embodiment, it would be apparent to those skilled in the art that various changes and modifications may be made thereto. Next, various modifications will be described with reference to FIGS. 12 through 19B, wherein like parts and components are designated by the same reference numerals as those in the above embodiment to avoid duplicating description.

Figure 12:
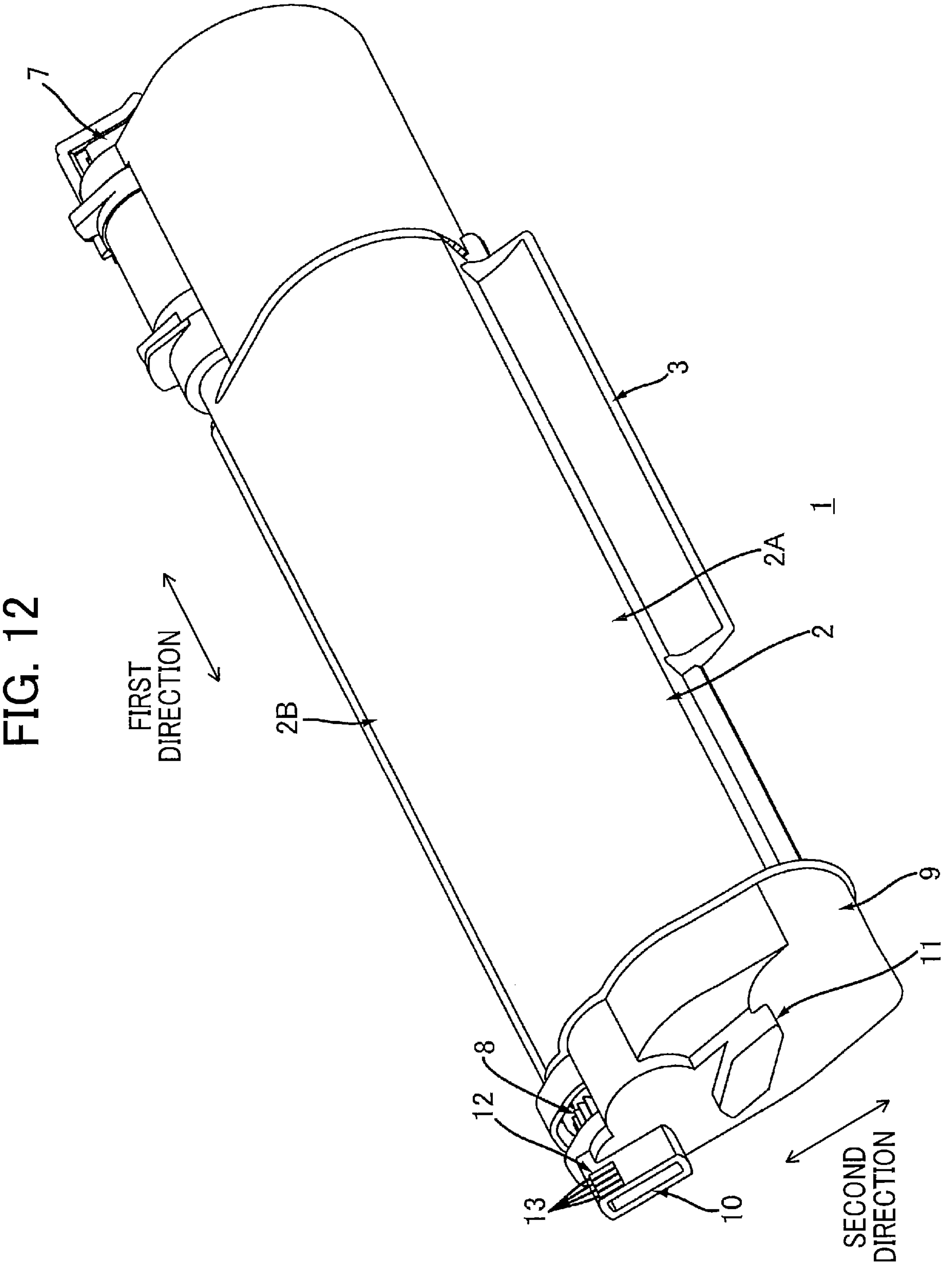
FIG. 12 is a perspective view of a toner cartridge.
Figure 13B:
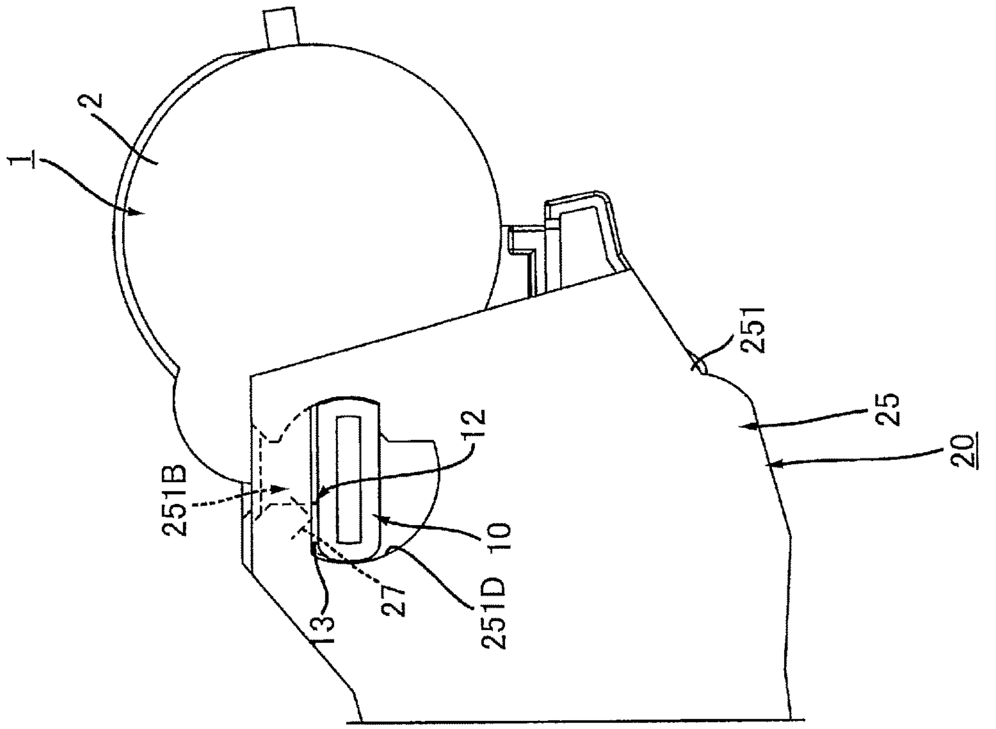
FIG. 13B illustrates a state where the casing illustrated in FIG. 13A is at the second position, the toner cartridge is attached to the drum cartridge, and the first electrical contact surface and the second electrical contact surface are in contact with each other.
Figure 13A:
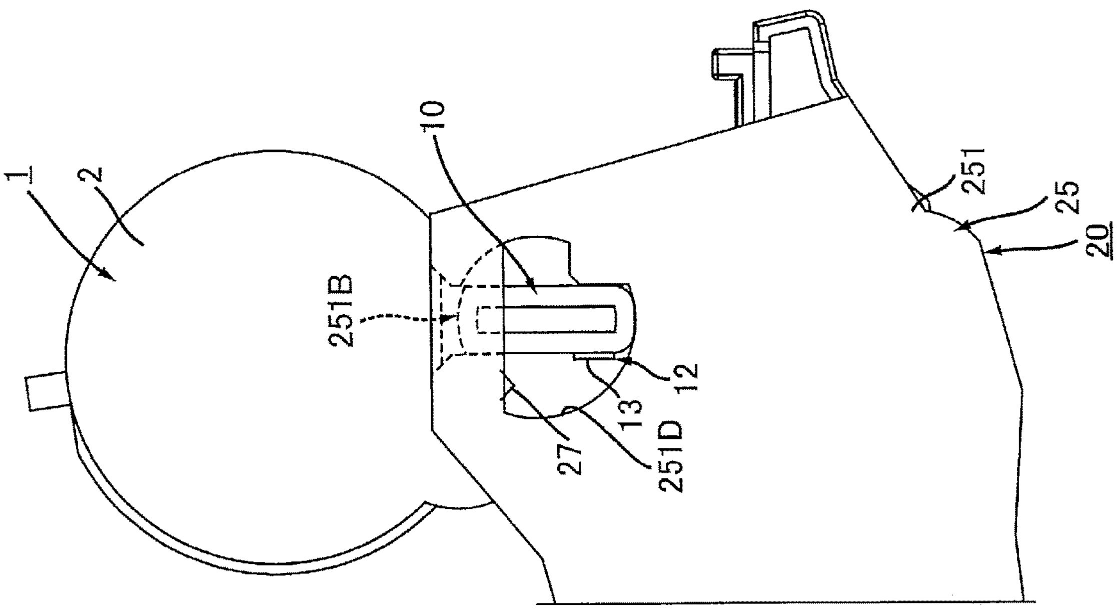
FIG. 13A illustrates a state where the toner cartridge is mounted to the drum cartridge, the casing is at the first position, and the first electrical contact surface and the second electrical contact surface are positioned away from each other.

(1) According to a first modification illustrated in FIGS. 12 through 13B, the memory 12 and the toner-side electrical contact surfaces 13 are positioned at the second protrusion 10. Specifically, the toner-side electrical contact surfaces 13 are positioned at one end portion in the second direction of the second protrusion 10. In the first modification, the first electrical contact surface 27 is positioned inside the recessed portion 251D of the developing casing 251, as illustrated in FIG. 13A. The toner-side electrical contact surfaces 13 do not make contact with the first electrical contact surface 27 when the casing 2 is at the first position. The toner-side electrical contact surfaces 13 make contact with the first electrical contact surface 27 when the casing 2 is at the second position, as illustrated in FIG. 13B.

Figure 14:
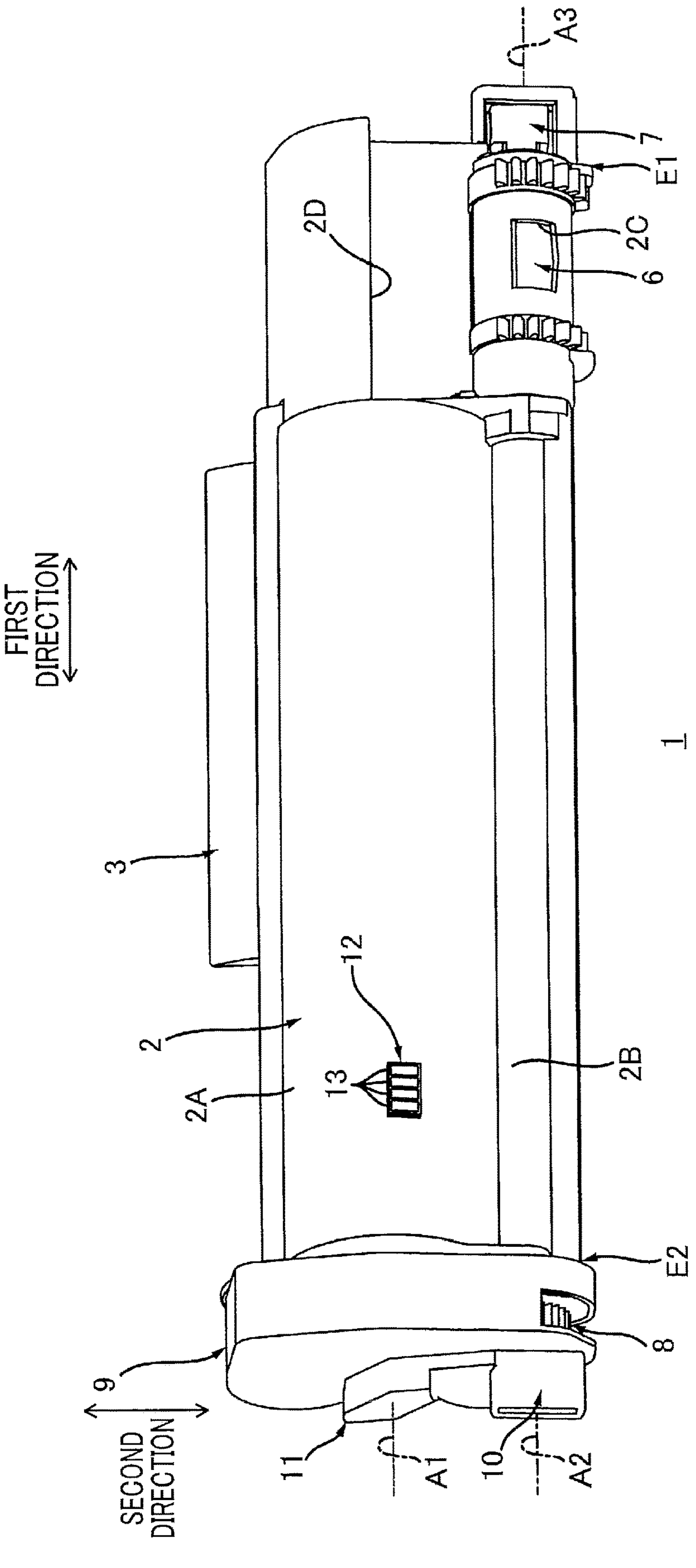
FIG. 14 is a perspective view of a toner cartridge.
Figure 15A:
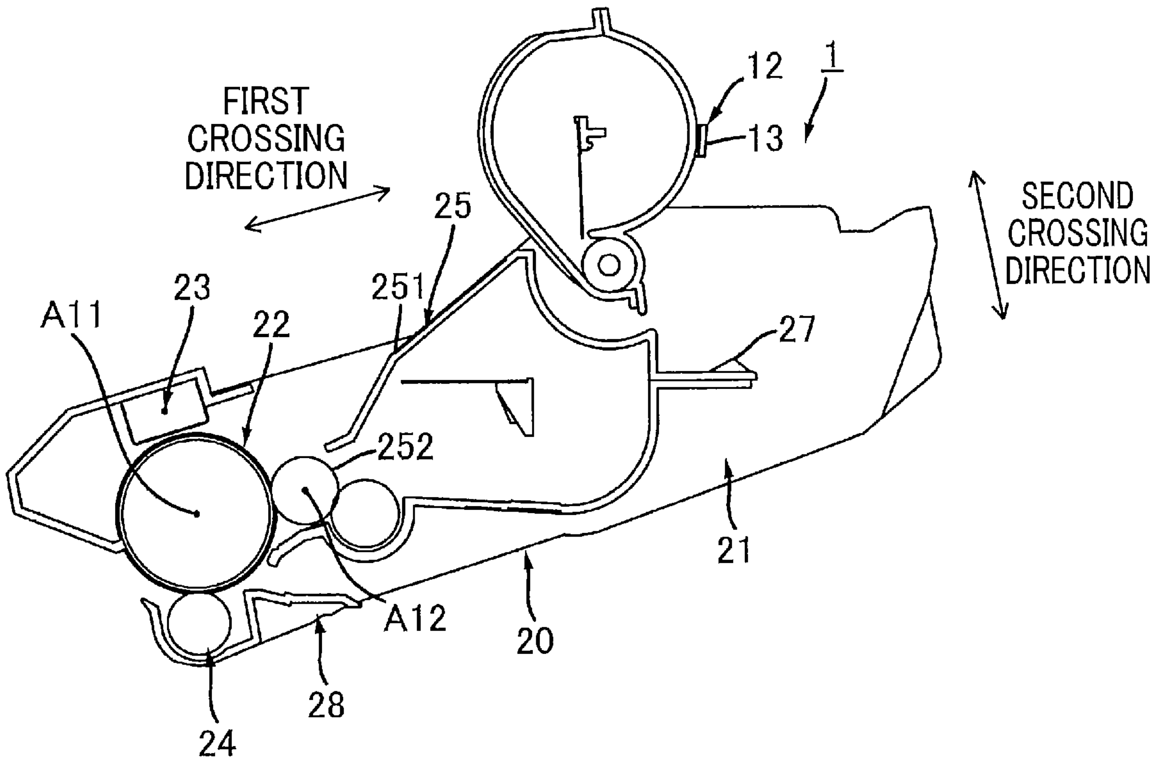
FIG. 15A illustrates a state where the toner cartridge is mounted to the drum cartridge, the casing is at the first position, and the first electrical contact surface and the second electrical contact surface are positioned away from each other.
Figure 15B:
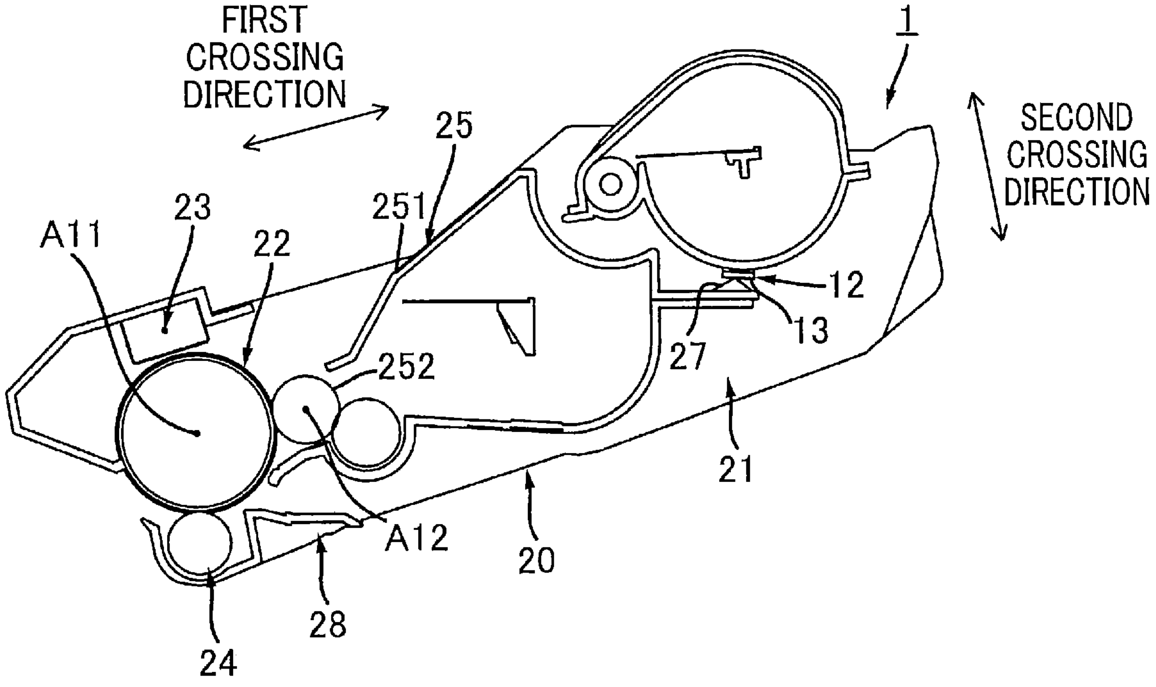
FIG. 15B illustrates a state where the casing illustrated in FIG. 15A is at the second position, the toner cartridge is attached to the drum cartridge, and the first electrical contact surface and the second electrical contact surface are in contact with each other.

(2) According to a second modification illustrated in FIGS. 14 through 15B, the memory 12 and the toner-side electrical contact surfaces 13 are positioned at the outer surface of the casing 2. In the second modification, as illustrated in FIG. 15A, the first electrical contact surface 27 is positioned at another end portion in the first crossing direction of the developing casing 251. The toner-side electrical contact surfaces 13 do not make contact with the first electrical contact surface 27 when the casing 2 is at the first position. As illustrated in FIG. 15B, the toner-side electrical contact surfaces 13 make contact with the first electrical contact surface 27 when the casing 2 is at the second position.

Figure 16:
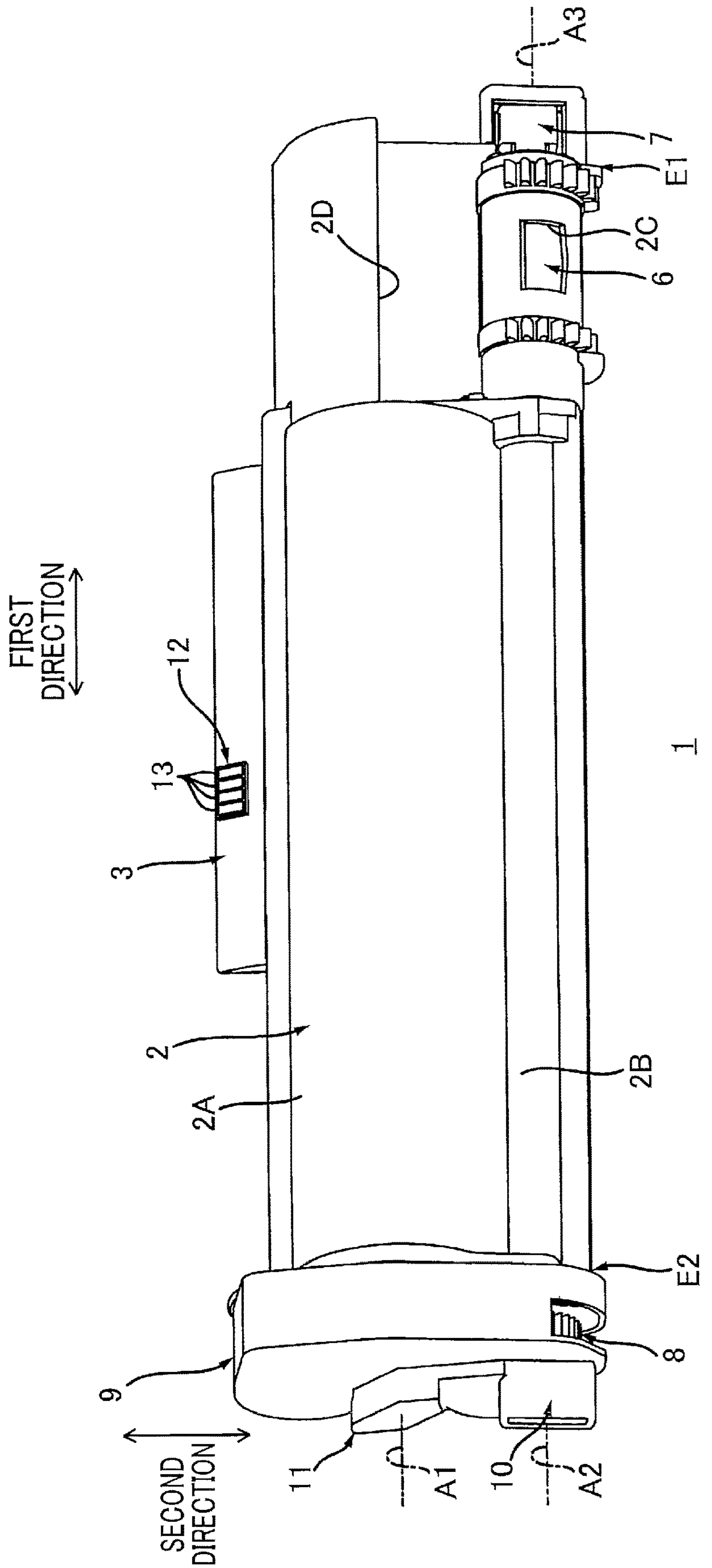
FIG. 16 is a perspective view of a toner cartridge.
Figure 17A:
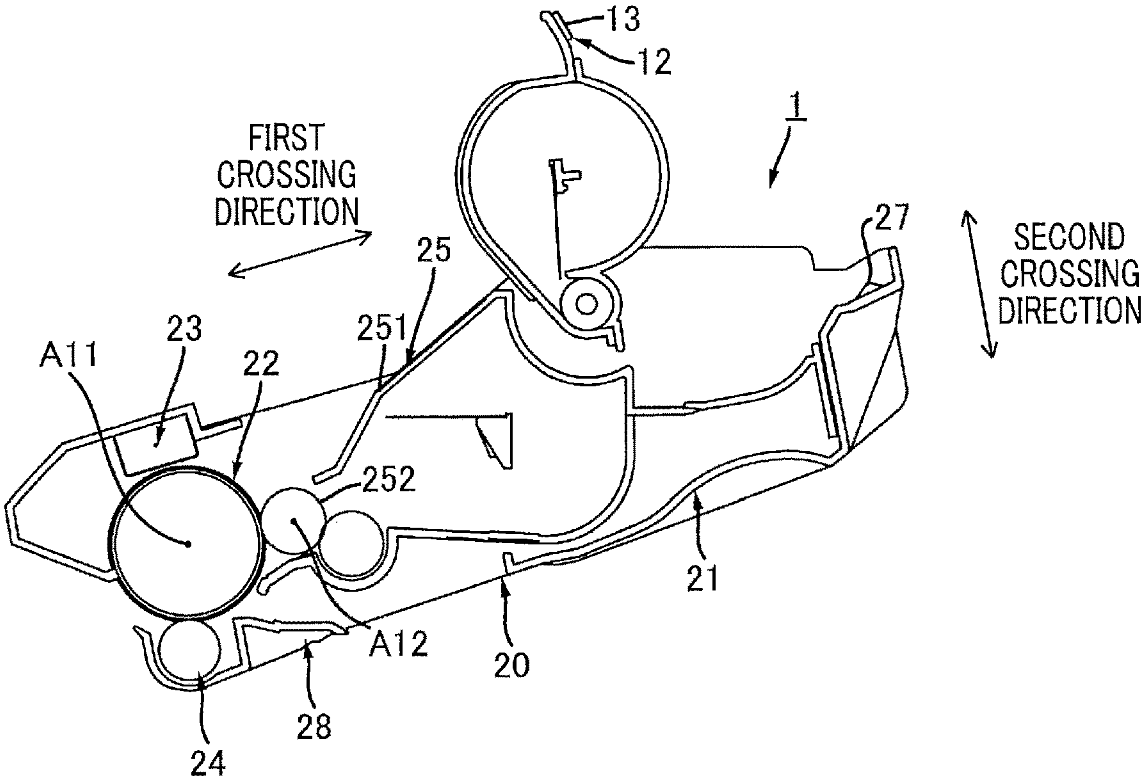
FIG. 17A illustrates a state where the toner cartridge is mounted to the drum cartridge, the casing is at the first position, and the first electrical contact surface and the second electrical contact surface are positioned away from each other.
Figure 17B:
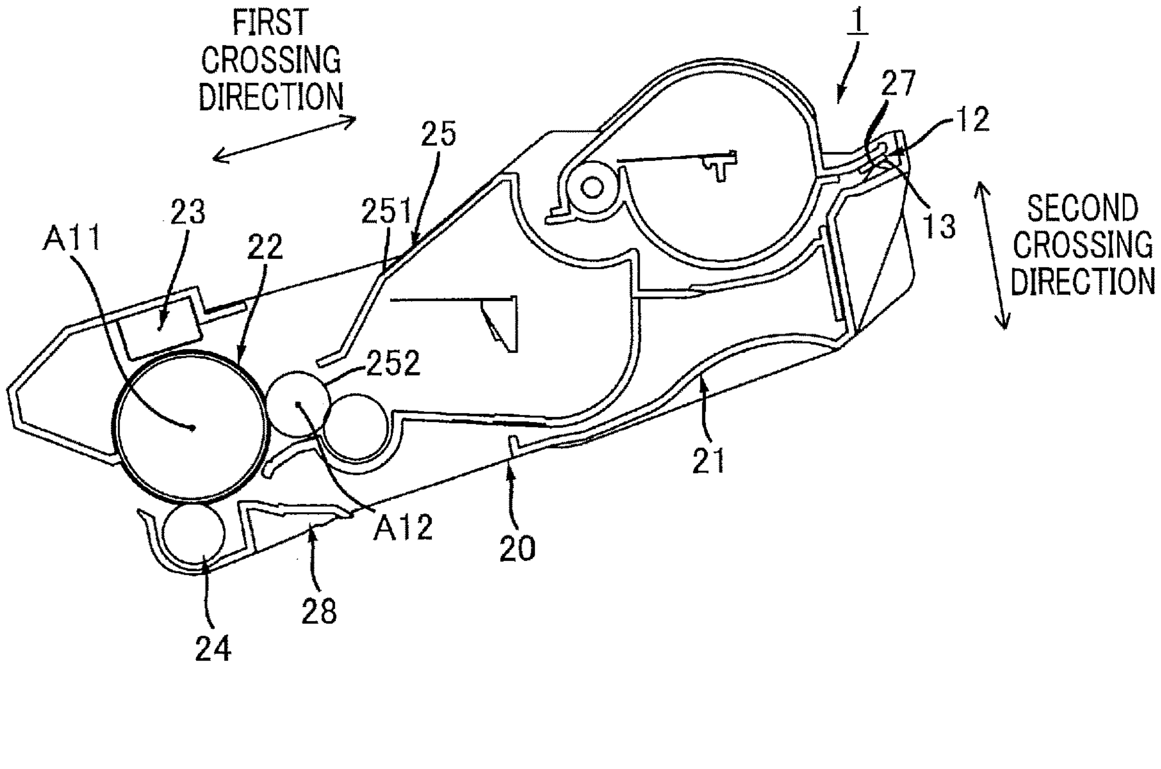
FIG. 17B illustrates a state where the casing illustrated in FIG. 17A is at the second position, the toner cartridge is attached to the drum cartridge, and the first electrical contact surface and the second electrical contact surface are in contact with each other.

(3) According to a third modification illustrated in FIG. 16 through 17B, the memory 12 and the toner-side electrical contact surfaces 13 are positioned at the handle 3. In the third modification, the first electrical contact surface 27 is positioned at the other end portion in the first crossing direction of the drum frame 21 as illustrated in FIG. 17A. The toner-side electrical contact surfaces 13 do not make contact with the first electrical contact surface 27 when the casing 2 is at the first position. As illustrated in FIG. 17B, the toner-side electrical contact surfaces 13 make contact with the first electrical contact surface 27 when the casing 2 is at the second position.

Figure 18:
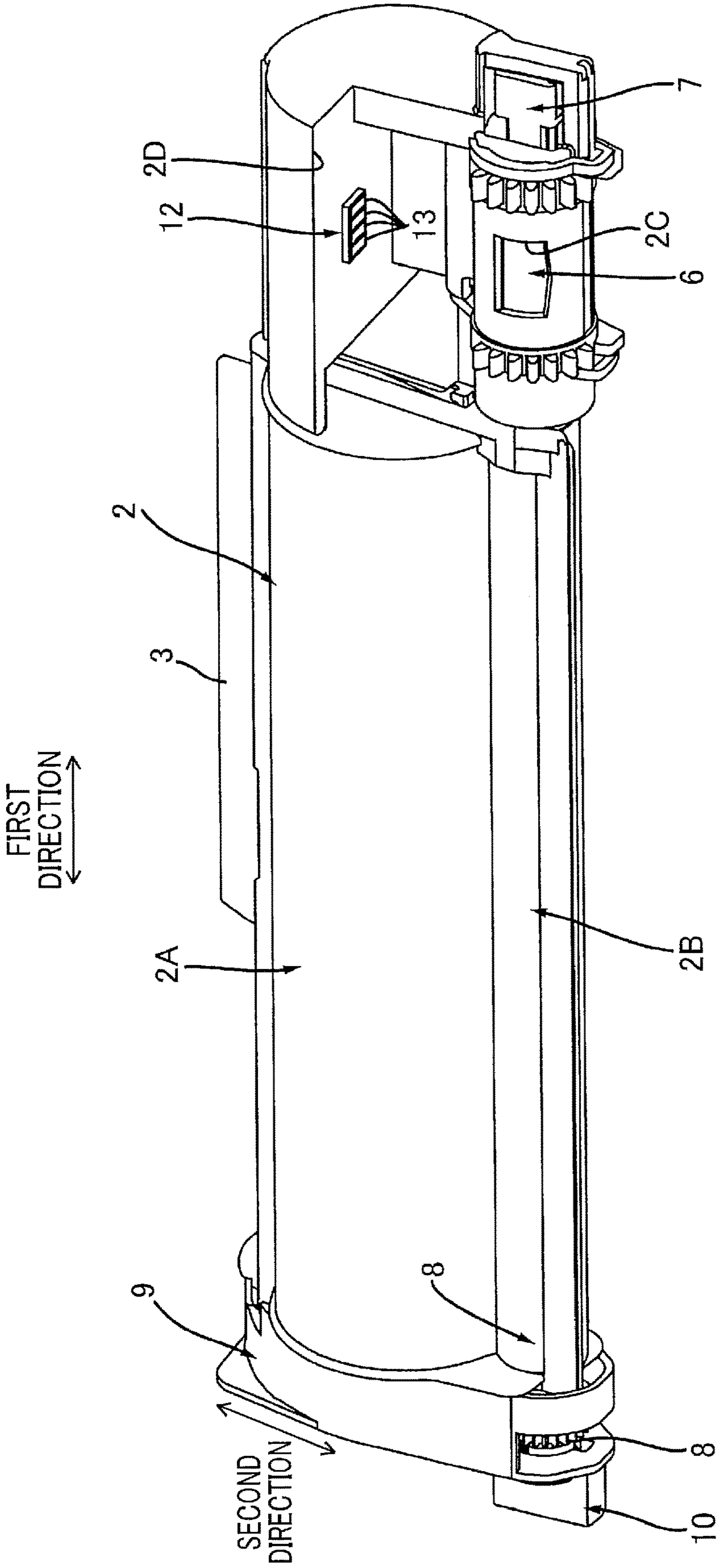
FIG. 18 is a perspective view of a toner cartridge.
Figure 19A:
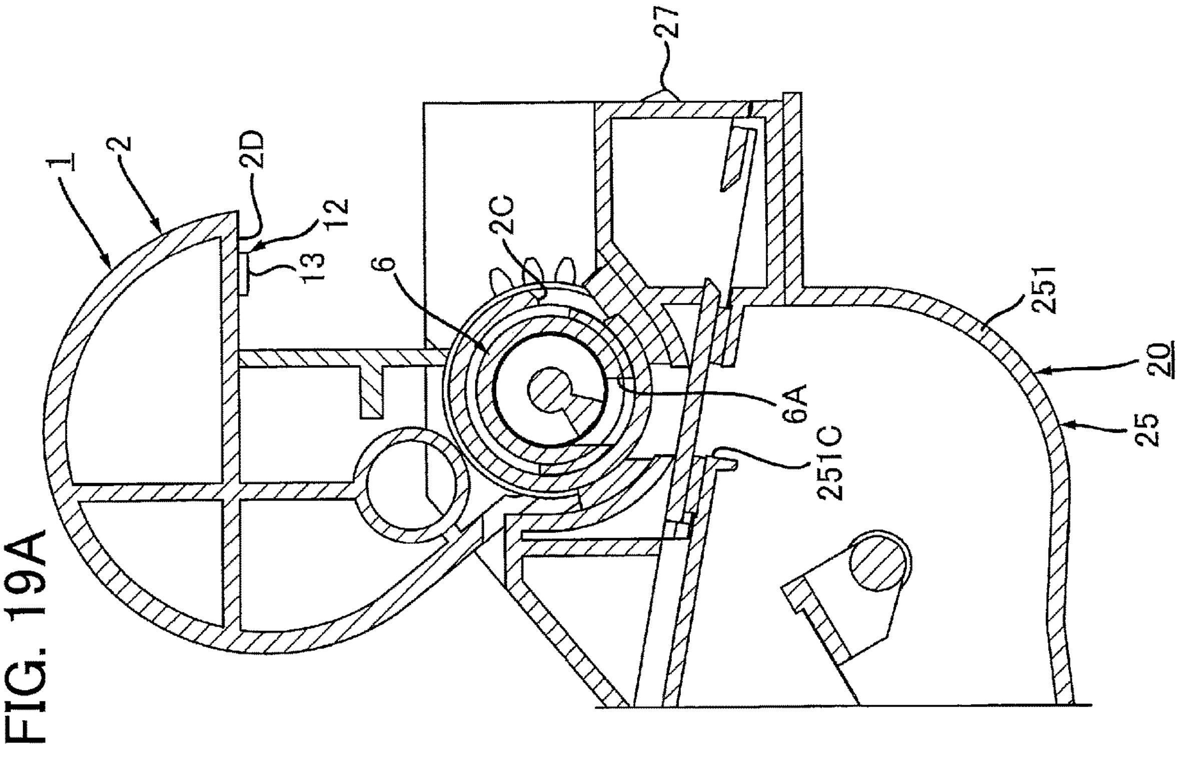
FIG. 19A illustrates a state where the toner cartridge is mounted to the drum cartridge, the casing is at the first position, and the first electrical contact surface and the second electrical contact surface are positioned away from each other.
Figure 19B:
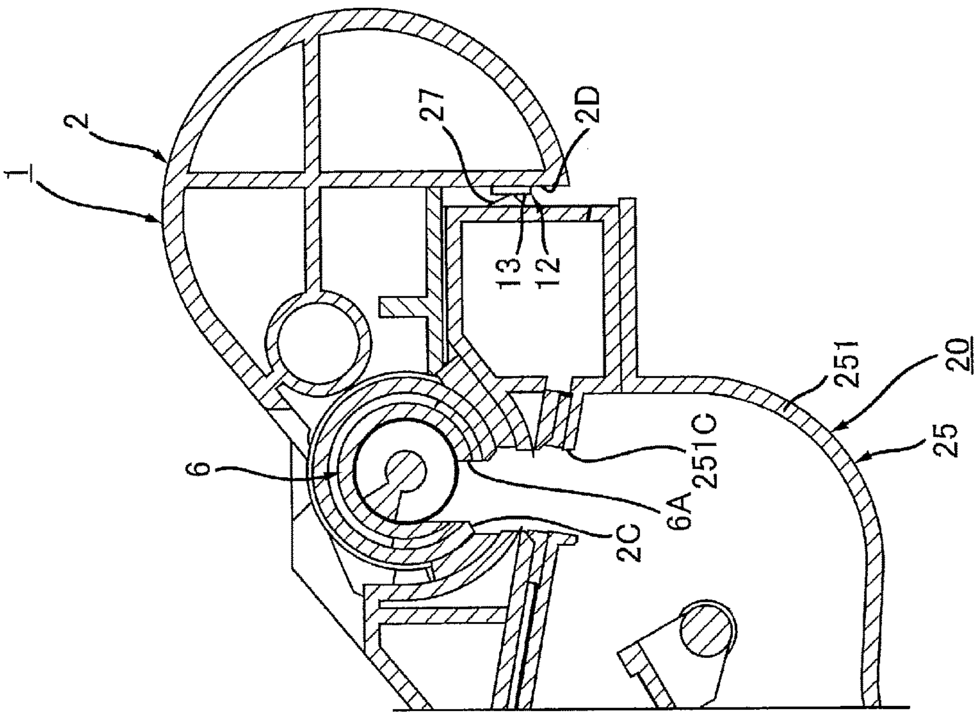
FIG. 19B illustrates where the casing illustrated in FIG. 19A is at the second position, the toner cartridge is attached to the drum cartridge, and the first electrical contact surface and the second electrical contact surface are in contact with each other.

(4) According to a fourth modification illustrated in FIG. 18 through 19B, the memory 12 and the toner-side electrical contact surfaces 13 are positioned inside the recessed portion 2D of the casing 2. In the fourth modification, as illustrated in FIG. 19A, the first electrical contact surface 27 is positioned at the other end portion in the first crossing direction of the developing casing 251. The first electrical contact surface 27 is positioned at the opposite side of the developing opening 251C from the photosensitive drum 22 in the first crossing direction. The toner-side electrical contact surfaces 13 do not make contact with the first electrical contact surface 27 when the casing 2 is at the first position. As illustrated in FIG. 19B, the toner-side electrical contact surfaces 13 make contact with the first electrical contact surface 27 when the casing 2 is at the second position.

The first to fourth modifications can exhibit the advantageous effects the same as those in the above-described embodiment.

What is claimed is:

1. A toner cartridge comprising:

a casing extending in a first direction, the casing including:

a first toner accommodating portion having a first interior space extending in the first direction; and a second toner accommodating portion positioned at one side in a second direction of the first toner accommodating portion and having a second interior space, the second interior space extending in the first direction and being in communication with the first interior space, the casing having a first opening positioned at one side in the first direction of the second toner accommodating portion, the first opening allowing toner in the second interior space to be discharged therethrough;

an agitator rotatable about a first axis extending in the first direction, the agitator being configured to agitate the toner in the first interior space and to convey the toner from the first interior space to the second interior space;

an auger rotatable about a second axis extending in the first direction, the auger being configured to convey the toner from the second interior space to the first opening;

a first protrusion positioned at the one side in the first direction of the second toner accommodating portion and positioned at one side in the first direction of the first opening, the first protrusion extending in the first direction;

a second protrusion positioned at another side in the first direction of the second toner accommodating portion, the second protrusion extending in the first direction;

a memory storing therein information relating to the toner cartridge; and a toner-side electrical contact surface electrically connected to the memory, wherein the first protrusion and the second protrusion are positioned relative to a drum cartridge when the toner cartridge is mounted to the drum cartridge, wherein the casing and the toner-side electrical contact surface are movable with the first protrusion and the second protrusion, and the casing and the toner-side electrical contact surface are pivotally movable around the first protrusion and the second protrusion from a first position to a second position, and wherein the casing and the toner-side electrical contact surface have a first state in which the toner-side electrical contact surface faces toward a third direction and a second state in which the toner-side electrical contact surface faces toward a fourth direction which is different from the third direction.

* * * * *